United States Patent
Bitar et al.

(10) Patent No.: US 11,176,313 B1
(45) Date of Patent: Nov. 16, 2021

(54) SYSTEM AND METHOD FOR CREATING EMAILS CONTAINING COMPLEX GRAPHICS AND CUSTOM OR NON-STANDARD WEB FONTS THAT ENSURES THEY WILL RENDER CONSISTENTLY ACROSS VIRTUALLY ALL OPERATING SYSTEMS, DEVICES, AND EMAIL CLIENTS

(71) Applicants: Martha Laura Bitar, San Francisco, CA (US); Rebecca Shostak, San Francisco, CA (US); Trong Dong, San Francisco, CA (US)

(72) Inventors: Martha Laura Bitar, San Francisco, CA (US); Rebecca Shostak, San Francisco, CA (US); Trong Dong, San Francisco, CA (US)

(*) Notice: Subject to any disclaimer, the term of this patent is extended or adjusted under 35 U.S.C. 154(b) by 0 days.

(21) Appl. No.: 16/893,179

(22) Filed: Jun. 4, 2020

Related U.S. Application Data

(60) Provisional application No. 62/901,062, filed on Sep. 16, 2019.

(51) Int. Cl.
*G06F 40/14* (2020.01)
*G06F 16/958* (2019.01)
*G06Q 10/10* (2012.01)

(52) U.S. Cl.
CPC ............ *G06F 40/14* (2020.01); *G06F 16/986* (2019.01); *G06Q 10/107* (2013.01); *G06Q 10/109* (2013.01)

(58) Field of Classification Search
CPC ..... G06F 40/14; G06F 16/986; G06Q 10/109; G06Q 10/107

USPC ......................................................... 715/234
See application file for complete search history.

(56) References Cited

U.S. PATENT DOCUMENTS

| | | | | |
|---|---|---|---|---|
| 2002/0015042 | A1* | 2/2002 | Robotham | G06F 3/14 345/581 |
| 2008/0091784 | A1* | 4/2008 | Sundstrom | G06F 40/126 709/206 |
| 2008/0285064 | A1* | 11/2008 | Ukigawa | G06F 40/143 358/1.13 |
| 2014/0055803 | A1* | 2/2014 | Uhlig | G06F 40/143 358/1.13 |
| 2014/0136973 | A1* | 5/2014 | Kumar | G06F 16/9574 715/274 |
| 2017/0090734 | A1* | 3/2017 | Fitzpatrick | G06F 40/106 |
| 2018/0302355 | A1* | 10/2018 | Nutt | G06Q 10/107 |

OTHER PUBLICATIONS

Kaufman, Lori. "How to Schedule or Delay Sending Email Messages in Outlook." How-To Geek, Jul. 13, 2017, <www.howtogeek.com/254282/how-to-schedule-or-delay-sending-email-messages-in-outlook.> (Year: 2017).*

* cited by examiner

*Primary Examiner* — Stephen S Hong
*Assistant Examiner* — Broderick C Anderson
(74) *Attorney, Agent, or Firm* — Plager Schack LLP; Mark H. Plager; Stephen Hallberg

(57) ABSTRACT

Methods for creating emails with complex graphics and customized web fonts that are ensured to render consistently across multiple platforms and email client applications and systems that ensure consistent rendering of created emails with complex graphics and customized web fonts by automatically transforming, completely transparently, the contents of each created email to a form that renders properly across the platforms and email clients are disclosed.

2 Claims, 15 Drawing Sheets

SYSTEM AND METHOD FOR CREATING EMAILS CONTAINING COMPLEX GRAPHICS AND CUSTOM OR NON-STANDARD WEB FONTS THAT ENSURES THEY WILL RENDER CONSISTENTLY ACROSS VIRTUALLY ALL OPERATING SYSTEMS, DEVICES, AND EMAIL CLIENTS

CLAIM OF BENEFIT TO PRIOR APPLICATION

This application claims benefit to U.S. Provisional Patent Application 62/901,062, entitled "A method to create emails containing complex graphics and custom or non-standard web fonts that ensures they will render consistently across virtually all operating systems, devices, and email clients," filed Sep. 16, 2019. The U.S. Provisional Patent Application 62/901,062 is incorporated herein by reference.

BACKGROUND

Embodiments of the invention described in this specification relate generally to email and visual rendering systems, and more particularly, to a method for creating emails containing complex graphics and custom or non-standard web fonts that ensures they will render consistently across virtually all operating systems, devices, and email clients.

Email messaging is ubiquitous in today's world. Email messages written in universally-supported conventional fonts with no artwork or other adornments are typically rendered the same regardless of the recipient's email client application, operating system (OS), and/or device. However, a wide range of email clients are in use today and many of them render HTML differently from other email clients. As a result, it is impractical to send emails with non-standard web fonts, layouts, and/or artwork in such a way as to have a consistent look across all email clients, operating systems, and devices (also referred to as "client" or "clients").

There are several reasons for the inconsistencies. For instance, email clients from different (and often competing) providers were created at different times assuming different versions of HTML. Also, there is no precise standard for rendering HTML, so even if two clients support the same version of HTML, they often render fonts, layout, and artwork in visually different manners. Additionally, rendering for non-standard web fonts is not automatically supported in these clients, even though many businesses often require the use of such fonts in email communications and/or marketing campaigns so that their customers receive email consistent with their branding. The inability to deal with these inconsistencies has been a strong disincentive for businesses to use email marketing at all.

Using third party products to bridge this gap is labor intensive, requires considerable expertise to ensure that the goal of consistency of appearance is maintained across all email clients, and typically gives rise to various other compatibility issues. Moreover, even minor changes to the text of any given email can require that the process be repeated.

Therefore, what is needed is a way to empower non-technical users in the creation and development of compelling emails that may include non-standard fonts, imagery, artwork, and/or other visual adornments, and to ensure that what these non-technical users see in their email creations is what any recipient of the email sees when they open the email, regardless of their email client application, OS, or device.

BRIEF DESCRIPTION

Novel methods for creating emails with complex graphics and customized web fonts that are ensured to render consistently across a plurality of platforms including known operating systems, devices, and email client applications and systems that ensure consistent rendering of created emails with complex graphics and customized web fonts by automatically transforming, completely transparently, the contents of each created email to a form that renders properly across the plurality of platforms are disclosed. In some embodiments, the plurality of platforms include known operating systems, devices, and all email client applications on any platform.

In some embodiments, the system that ensures consistent rendering of emails with complex graphics and customized web fonts across a plurality of platforms comprises a backend server, a complex subtree scanning module, a subtree-to-image conversion module, and a subtree replacement editor and image reference manager. In some embodiments, the backend server of the system receives HTML output of an email with complex graphical elements and the email as composed in a what-you-see-is-what-you-get ("WYSIWYG") editor of an email client. In some embodiments, the complex graphical elements comprise one or both of complex graphics and customized web fonts.

In some embodiments, the method for creating emails with complex graphics and customized web fonts that are ensured to render consistently across a plurality of platforms performs a plurality of steps comprising (i) using a specialized editor of an email client to compose an email with complex graphical elements, (ii) outputting HTML of the composed email, (iii) providing the HTML output and the email to a cloud application service for processing of the HTML and the email by a backend server, (iv) receiving HTML optimized for email, and (v) configuring email delivery options and preparing to send the HTML-optimized email by way of a delivery service. In some embodiments, the specialized editor comprises a WYSIWYG email client. In some embodiments, the complex graphical elements comprise one or both of complex graphics and customized web fonts.

In some embodiments, the backend server performs a backend server process for processing the HTML and the email comprising (i) receiving the HTML output and the email from the WYSIWYG email client at the backend server, (ii) scanning the received HTML looking for complex subtrees, (iii) converting each subtree into an image, (iv) replacing each subtree with a reference to the image, and (v) outputting HTML optimized for email.

In some embodiments, the detailed backend server process for processing an email with a single complex graphical element includes (i) receiving HTML output and an email from a WYSIWYG email client, (ii) scanning an HTML tree of the received HTML output looking for complex subtrees, (iii) detecting an <SVG> element in the HTML tree, (iv) rendering the HTML tree using an HTML rendering engine, (v) replacing a subtree of the HTML tree associated with the detected <SVG> element with a reference to an image of the rendered HTML tree, and (vi) outputting HTML optimized for email.

In some embodiments, the detailed backend server process for processing an email with multiple complex graphical elements includes (i) receiving the email and HTML output of the email from a WYSIWYG email client, (ii) scanning an HTML tree of the received HTML output looking for and flagging complex subtrees, (iii) determining when flagged subtrees are detected in the HTML tree, (iv) rendering each flagged HTML subtree using an HTML rendering engine, (v) capturing an image of each complex subtree rendering, (vi) replacing each complex subtree in the HTML tree with a new image subtree which references the captured image, (vii) repeating for each flagged complex subtree, and (viii) outputting HTML optimized for email.

In some embodiments, the system that ensures consistent rendering of emails with complex graphics and customized web fonts across a plurality of platforms comprises a backend server, a complex subtree scanning module, a subtree-to-image conversion module, and a subtree replacement editor and image reference manager. In some embodiments, the complex subtree scanning module comprises an HTML tree scan manager, a complex subtree identification module, and a complex subtree flagging module. In some embodiments, the subtree-to-image conversion module comprises an HTML rendering engine, a screenshot capture unit, and a raster conversion engine that produces a new flat rasterized image. In some embodiments, the subtree replacement editor and image reference manager comprises an HTML subtree code generator, a subtree code replacement module, and a complete HTML tree scan verification unit. In some embodiments, the backend server of the system receives HTML output of an email with a plurality of complex graphical elements and the email as composed in a WYSIWYG editor of an email client.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
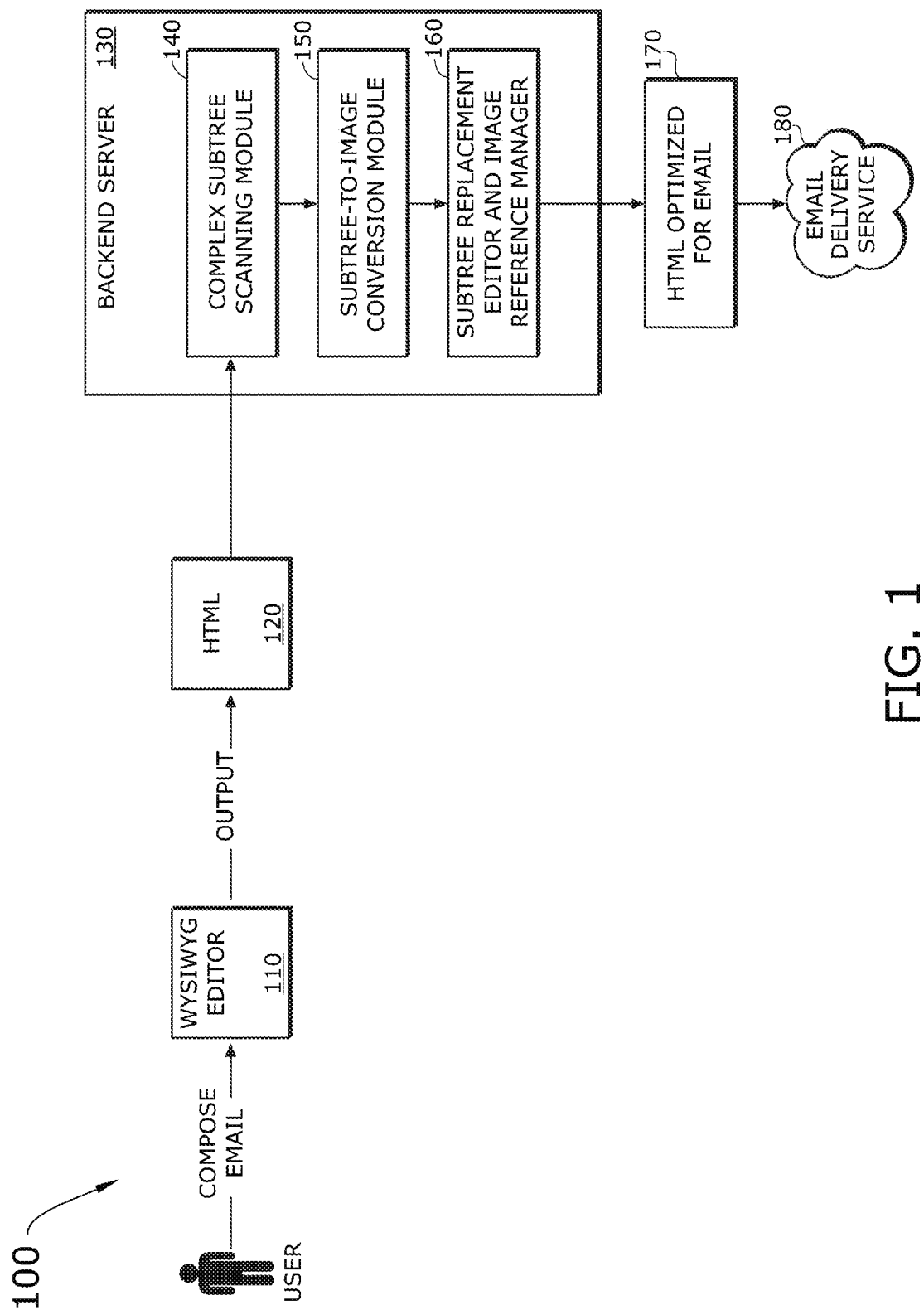
FIG. 1 conceptually illustrates a schematic diagram of a system to create emails with complex graphics and customized web fonts that are ensured to render consistently across several platforms in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method for creating emails with complex graphics and customized web fonts that are ensured to render consistently across a plurality of platforms and a novel system that ensures consistent rendering of emails with complex graphics and customized web fonts across a plurality of platforms. In some embodiments, the plurality of platforms comprises known operating systems, devices, and email client applications. In some embodiments, the method and system automatically transform, completely transparently, the contents of a created email to a form that renders properly across all email clients on any platform in the plurality of platforms.

In some embodiments, the system that ensures consistent rendering of emails with complex graphics and customized web fonts across a plurality of platforms comprises a backend server, a complex subtree scanning module, a subtree-to-image conversion module, and a subtree replacement editor and image reference manager. In some embodiments, the backend server of the system receives HTML output of an email with complex graphical elements and the email as composed in a what-you-see-is-what-you-get ("WYSIWYG") editor of an email client. In some embodiments, the complex graphical elements comprise one or both of complex graphics and customized web fonts. In some embodiments, the complex subtree scanning module of the backend server scans the HTML output to identify subtrees referencing the complex graphical elements in the email. In some embodiments, the subtree-to-image conversion module captures a rasterized image of each identified subtree referencing one or more complex graphical elements. In some embodiments, the subtree replacement editor and image reference manager replaces each identified subtree with a new image subtree that references the corresponding rasterized image. In some embodiments, the backend server produces HTML optimized for email based on the replacement of each identified subtree referencing one or more complex graphical elements with the corresponding new image subtree in the HTML output of the email.

In some embodiments, the method for creating emails with complex graphics and customized web fonts that are ensured to render consistently across a plurality of platforms performs a plurality of steps comprising (i) using a specialized editor of an email client to compose an email with complex graphical elements, (ii) outputting HTML of the composed email, (iii) providing the HTML output and the email to a cloud application service for processing of the HTML and the email by a backend server, (iv) receiving HTML optimized for email, and (v) configuring email delivery options and preparing to send the HTML-optimized email by way of a delivery service. In some embodiments, the specialized editor comprises a WYSIWYG email client. In some embodiments, the complex graphical elements comprise one or both of complex graphics and customized web fonts.

In some embodiments, the backend server performs a backend server process for processing the HTML and the email comprising (i) receiving the HTML output and the email from the WYSIWYG email client at the backend server, (ii) scanning the received HTML looking for complex subtrees, (iii) converting each subtree into an image, (iv) replacing each subtree with a reference to the image, and (v) outputting HTML optimized for email.

In some embodiments, the detailed backend server process for processing an email with a single complex graphical element includes (i) receiving HTML output and an email from a WYSIWYG email client, (ii) scanning an HTML tree of the received HTML output looking for complex subtrees, (iii) detecting an <SVG> element in the HTML tree, (iv) rendering the HTML tree using an HTML rendering engine, (v) replacing a subtree of the HTML tree associated with the detected <SVG> element with a reference to an image of the rendered HTML tree, and (vi) outputting HTML optimized for email.

In some embodiments, the detailed backend server process for processing an email with multiple complex graphical elements includes (i) receiving the email and HTML output of the email from a WYSIWYG email client, (ii) scanning an HTML tree of the received HTML output looking for and flagging complex subtrees, (iii) determining when flagged subtrees are detected in the HTML tree, (iv) rendering each flagged HTML subtree using an HTML rendering engine, (v) capturing an image of each complex subtree rendering, (vi) replacing each complex subtree in the HTML tree with a new image subtree which references the captured image, (vii) repeating for each flagged complex subtree, and (viii) outputting HTML optimized for email.

In some embodiments, the system that ensures consistent rendering of emails with complex graphics and customized web fonts across a plurality of platforms comprises a backend server, a complex subtree scanning module, a subtree-to-image conversion module, and a subtree replacement editor and image reference manager. In some embodiments, the backend server of the system receives HTML output of an email with a plurality of complex graphical elements and the email as composed in a WYSIWYG editor of an email client. In some embodiments, the each complex graphical element in the plurality of complex graphical elements comprise one or both of complex graphics and customized web fonts.

In some embodiments, the complex subtree scanning module comprises an HTML tree scan manager, a complex subtree identification module, and a complex subtree flagging module. In some embodiments, the complex subtree scanning module of the backend server provides the HTML output to the HTML tree scan manager which scans the HTML tree looking for subtree code structures. When the HTML tree scan manager finds a subtree in the HTML tree, the complex subtree identification module evaluates the structure of the subtree code to determine whether the found subtree is a type of complex HTML subtree to flag for replacement. When the complex subtree identification module determines that an evaluated subtree is not the type of complex HTML subtree to flag for replacement, the HTML tree scan manager continues to scan through the HTML tree. On the other hand, when the complex subtree identification module determines that an evaluated subtree is the type of complex subtree to flag, the complex subtree flagging module flags the subtree in the HTML tree. In some embodiments, the complex subtree scanning module performs scanning, subtree evaluation, and subtree flagging for the entire HTML tree before handing the HTML tree over to the subtree-to-image conversion module. In some other embodiments, the complex subtree scanning module hands the HTML tree over to the subtree-to-image conversion module when the complex subtree flagging module flags a single subtree in the HTML tree, with the HTML tree scan manager saving a scan position at the start of the next subtree code structure after the flagged subtree in the HTML tree to continue with scanning, subtree evaluation, and subtree flagging later, after processing is completed by the subtree-to-image conversion module and the subtree replacement editor and image reference manager.

In some embodiments, the subtree-to-image conversion module comprises an HTML rendering engine, a screenshot capture unit, and a raster conversion engine that produces a new flat rasterized image. In some embodiments, the subtree-to-image conversion module provides the HTML tree received from the complex subtree scanning module to the HTML rendering engine to render the HTML in an output format. After rendering the HTML tree, the screenshot capture unit takes a screenshot of the rendered HTML. Upon capturing the screenshot, the raster conversion engine converts the screenshot to a new rasterized image.

In some embodiments, the subtree replacement editor and image reference manager comprises an HTML subtree code generator, a subtree code replacement module, and a complete HTML tree scan verification unit. In some embodiments, the HTML subtree code generator generates HTML subtree code for the new rasterized image. The generated HTML subtree code is then passed to the subtree code replacement module which replaces the original flagged HTML subtree in the HTML tree with the generated HTML subtree code referencing the new rasterized image. After replacing the original flagged HTML subtree in the HTML tree, the complete HTML tree scan verification unit checks to see whether the entire HTML tree for the email has been scanned. When scanning of the HTML tree is incomplete, the complete HTML tree scan verification unit sends the updated HTML tree back to the complex subtree scanning module which triggers the HTML tree scan manager to continue scanning at the saved scan position in the updated HTML tree. On the other hand, when scanning of the HTML tree is verified as completed by the complete HTML tree scan verification unit, the subtree replacement editor and image reference manager hands the fully updated HTML tree to the backend server which then produces HTML optimized for email, as noted above.

As stated above, email messaging is ubiquitous in today's world. Email messages written in universally-supported conventional fonts with no artwork or other adornments are typically rendered the same regardless of the recipient's email client application, operating system (OS), and/or device. However, a wide range of email clients are in use today and many of them render HTML differently from other email clients. As a result, it is impractical to send emails with non-standard web fonts, layouts, and/or artwork in such a way as to have a consistent look across all email clients. There are several reasons for the inconsistencies, including (i) email clients from different (and often competing) providers were created at different times assuming different versions of HTML, (ii) there is no precise standard for rendering HTML, so even if two clients support the same version of HTML, they often render fonts, layout, and artwork in a visually different manner, and (iii) rendering for non-standard web fonts is not automatically supported in these clients, even though many businesses often require the use of such fonts in email communications and/or marketing campaigns so that their customers receive email consistent with their branding. The inability to deal with these inconsistencies has been a strong disincentive for businesses to use email marketing at all. Using third party products to bridge this gap is problematic and labor-intensive. Embodiments of the methods for creating emails with complex graphics and customized web fonts that are ensured to render consistently across multiple platforms and email client applications and systems that ensure consistent rendering of created emails with complex graphics and customized web fonts by automatically transforming, completely transparently, the contents of each created email to a form that renders properly across the platforms and email clients described in this specification solve such problems by allowing even non-technical users to build compelling emails containing the complex graphical elements described above using a WYSIWYG editor of an email client or separate application. This is accomplished by automatically transforming, completely transparently, the contents of any such created email to a form that renders properly across all email clients. Some embodiments of the methods and systems automatically convert complex graphic collages (including overlapped images and multi-framed animated GIFs), and text using non-standard web fonts into rasterized images, and then inserting these images into the HTML tree code of the email in such a way as to ensure the content is rendered in the same way no matter what operating system, device, or email client is used.

The embodiments described in this specification differ from and improve upon currently existing options. In particular, some embodiments differ because previously, incorporating complex graphics and non-standard fonts into marketing emails required an elaborate manual process involving the use of third-party products (such as Adobe Photoshop) to create rasterized images of the layout, art work, and non-standard font text, and to reinsert these images into the email. However, the large majority of users of current email marketing platforms lack the time or technical expertise to engage in such a process, and instead sacrifice consistency of appearance for convenience. By contrast, our the systems and methods described in this specification give email marketers all the tools to satisfy users in terms of convenience, consistency of appearance, and automatic support for non-standard fonts needed for branding.

In addition, embodiments described in this specification improve upon previous email delivery systems which do not build in the capability to produce marketing emails that incorporate complex graphical images and non-standard or custom fonts in such a way as to ensure that the appearance is exactly preserved across the full spectrum of email clients that customers may be using. These elements are important for branding and for retaining the modern look which, up until now, only print and televised media afford. The processes, methods, and systems described herein solve these problems by automatically transforming the contents of a created email—with as many nuanced or layered complex graphical elements as a user desires—to a form that renders properly across all email clients.

The methods for creating emails with complex graphics and customized web fonts that are ensured to render consistently across multiple platforms and email clients and the systems that ensure consistent rendering of created emails with complex graphics and customized web fonts by automatically transforming, completely transparently, the contents of each created email to a form that renders properly across all email clients of the present disclosure may be comprised of the following elements. This list of possible constituent elements is intended to be exemplary only and it is not intended that this list be used to limit the methods and systems of the present application to just these elements. Persons having ordinary skill in the art relevant to the present disclosure may understand there to be equivalent elements that may be substituted within the present disclosure without changing the essential function or operation of the methods for creating emails with complex graphics and customized web fonts that are ensured to render consistently across multiple platforms and email clients and the systems that ensure consistent rendering of created emails with complex graphics and customized web fonts by automatically transforming, completely transparently, the contents of each created email to a form that renders properly across all email clients.

1. A WYSIWYG editor software that allows composition of emails with graphic image collages as well as text using both standard and non-standard web fonts.

2. A backend server software that communicates with the editor and transforms the composed email into a form that, when rendered on the client, maintains all layout, formatting and fonts so that all receivers of the email will see exactly the same thing irrespective of their email clients.

3. A scalable means of delivery of these emails (such as through Amazon or other services used for this purpose).

The components of the methods for creating emails with complex graphics and customized web fonts that are ensured to render consistently across multiple platforms and email clients and the systems that ensure consistent rendering of created emails with complex graphics and customized web fonts by automatically transforming, completely transparently, the contents of each created email to a form that renders properly across all email clients are related in the following exemplary manner. The examples are not intended as limiting but for purposes of explanation. A user of a software application that implements the methods and systems to create emails with complex graphics and customized web fonts that are ensured to render consistently across several platforms will run a browser-based application implementing a WYSIWYG editor (1) to create an email which may include complex graphical or font-based text, graphics (individually or layered/collage-style), and links to web pages, as well as other possible elements, like graphical tools and interface items. When finished, the HTML representation of the email, together with some additional information is sent to a back-end server (2) that converts it into a form suitable for rendering on email clients in a way that maintains the appearance irrespective of the email client. Then, after the back-end server produces HTML optimized for email, the email message with optimal HTML can be queued for sending (3) to the recipients either using a proprietary email delivery application or a paid service such as provided by Amazon and other vendors.

By way of example, FIG. 1 conceptually illustrates a schematic diagram of a system to create emails with complex graphics and customized web fonts that are ensured to render consistently across several platforms 100. The system to create emails with complex graphics and customized web fonts that are ensured to render consistently across several platforms 100 includes a WYSIWYG editor 110, HTML output 120, a backend server 130, a complex subtree scanning module 140, a subtree-to-image conversion module 150, a subtree replacement editor and image reference manager 160, HTML that is optimized for email ("optimized HTML") 170, and an email delivery service 180 that provides services for delivering the email with the optimized HTML. As shown in this figure, a user composes an email message using the WYSIWYG editor 110. The email may include complex graphical elements, such as individual images or multiple layered images or collages of images, as well as custom fonts that are not typically present on all platforms or the web. The complex graphical elements and custom web fonts may be composited and incorporated into the email the user is composing as a type of scalable vector graphics image with corresponding XML/HTML code that makes up a portion of an overall HTML code tree ("HTML tree") for the email message that user is composing. The HTML tree in this example is referred to as the HTML output 120, which is transmitted to the backend server 130.

When the backend server 130 receives the HTML output 120 for the composed email, the complex graphical elements that may be present may be organized in a complex manner in the HTML tree, despite being assembled in the WYSIWYG editor 110, which is an email client application with an editor interface that ensure that what the user sees when composing the email is what the user gets after the email is completed. However, this guarantee of what-you-see-is-what-you-get is conventionally only a guarantee on the same device and within the same email client application. Yet, since the email is intended for viewing by other users on other devices and who may use other email client applications, the guarantee of what-you-see-is-what-you-get no longer holds, since any given email client may not have one or more of the customized fonts present in the email, or may not render the complexly structured imagery in the same manner, resulting in disparate or mangled images that no long evoke the same visual sense as intended during email creation with the WYSIWYG editor of the email client. To remedy this problem, the backend server 130 feeds the HTML output 120 to the complex subtree scanning module 140 which scans the HTML output to identify subtrees referencing the complex graphical elements in the email. After scanning the HTML output, the backend server 130 triggers the subtree-to-image conversion module 150 to capture a rasterized image of each identified subtree referencing one or more complex graphical elements. Then the backend server 130 instructs the subtree replacement editor and image reference manager 160 to replace each identified subtree with a new image subtree (or rather, new image HTML subtree) that references the corresponding rasterized image. After completing these processing operations for the entire HTML tree of the HTML output 120, the backend server 130 produces HTML optimized for email 170 (or "optimized HTML") based on the replacement of each identified subtree referencing one or more complex graphical elements with the corresponding new image HTML subtree in the HTML output of the email. Then the email (with the optimized HTML) is provided to the email delivery service 180 to be sent to email recipients whose email client applications and/or devices will render the HTML of the email consistently and as the user intended when using the WYSIWYG editor of the email client to compose the email.

As the example described by reference to FIG. 1 demonstrates, a software implementation is a common manner of interacting with a WYSIWYG editor to create an email which includes text using standard and non-standard web fonts, graphics, clickable links to web pages, and other HTML elements such as buttons, any of which may be problematic in rendering in other email client applications or on other devices. Additionally, any such software and browser-based application that implements the WYSIWYG editor may also include professionally-designed, predefined templates and/or layouts. Such templates and/or layouts may include text and artwork that can be easily customized by the user in the WYSIWYG editor, so that even an inexperienced user may create professional-looking emails.

Figure 2:
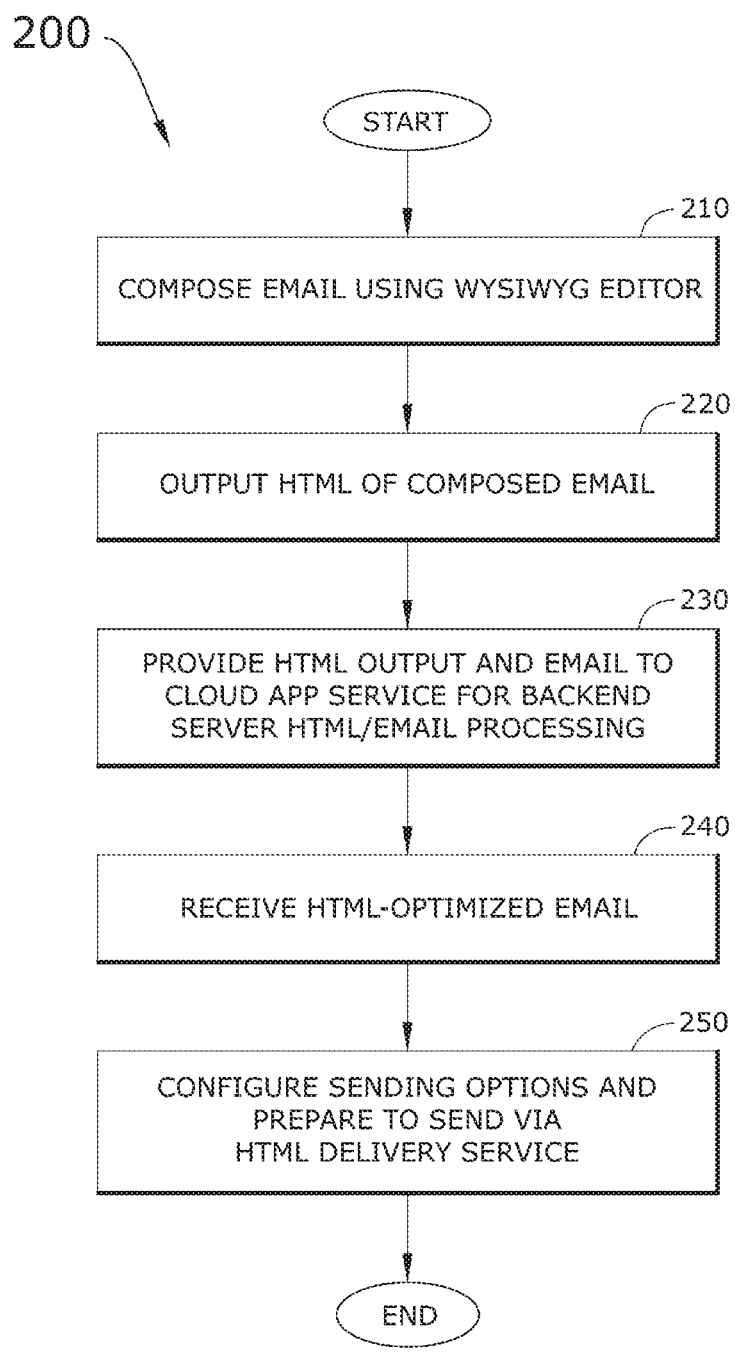
FIG. 2 conceptually illustrates a high level process for creating emails with complex graphics and customized web fonts that are ensured to render consistently across multiple platforms in some embodiments.

Turning to another example, FIG. 2 conceptually illustrates a high level process for creating emails with complex graphics and customized web fonts that are ensured to render consistently across multiple platforms 200. As shown in this figure the high level process for creating emails with complex graphics and customized web fonts that are ensured to render consistently across multiple platforms 200 starts with composing (at 210) an email by using a specialized editor of an email client. The specialized editor may be a WYSIWYG editor integrated into the email client itself or may be a WYSIWYG editor that is a separate software application which enables users to create complex graphical imagery with images and custom fonts, etc., and where such complex graphical imagery is imported into the email client and added to the email being composed by the user. In some embodiments, the high level process for creating emails with complex graphics and customized web fonts that are ensured to render consistently across multiple platforms 200 outputs (at 220) HTML code (or an "HTML tree") of the composed email. After outputting the HTML, the high level process for creating emails with complex graphics and customized web fonts that are ensured to render consistently across multiple platforms 200 of some embodiments provides (at 230) the HTML output and the email to a backend server for processing. In some embodiments, the backend server is accessible to the email client application (and WYSIWYG editor) by way of a cloud application service that provides a software-as-a-service (SaaS) cloud-computing architecture for processing of the HTML and the email by a backend cloud-based server. Further details of a network architecture of a cloud-based system that ensures consistent rendering of emails with complex graphics and customized web fonts across several platforms are described below, by reference to FIG. 14. Next, the high level process for creating emails with complex graphics and customized web fonts that are ensured to render consistently across multiple platforms 200 of some embodiments receives (at 240) the HTML optimized for email, which is followed by configuration of email delivery options and preparation (at 250) of the email with optimized HTML to send to one or more specified recipients by way of an email delivery service. Then the high level process for creating emails with complex graphics and customized web fonts that are ensured to render consistently across multiple platforms 200 ends.

Figure 3:
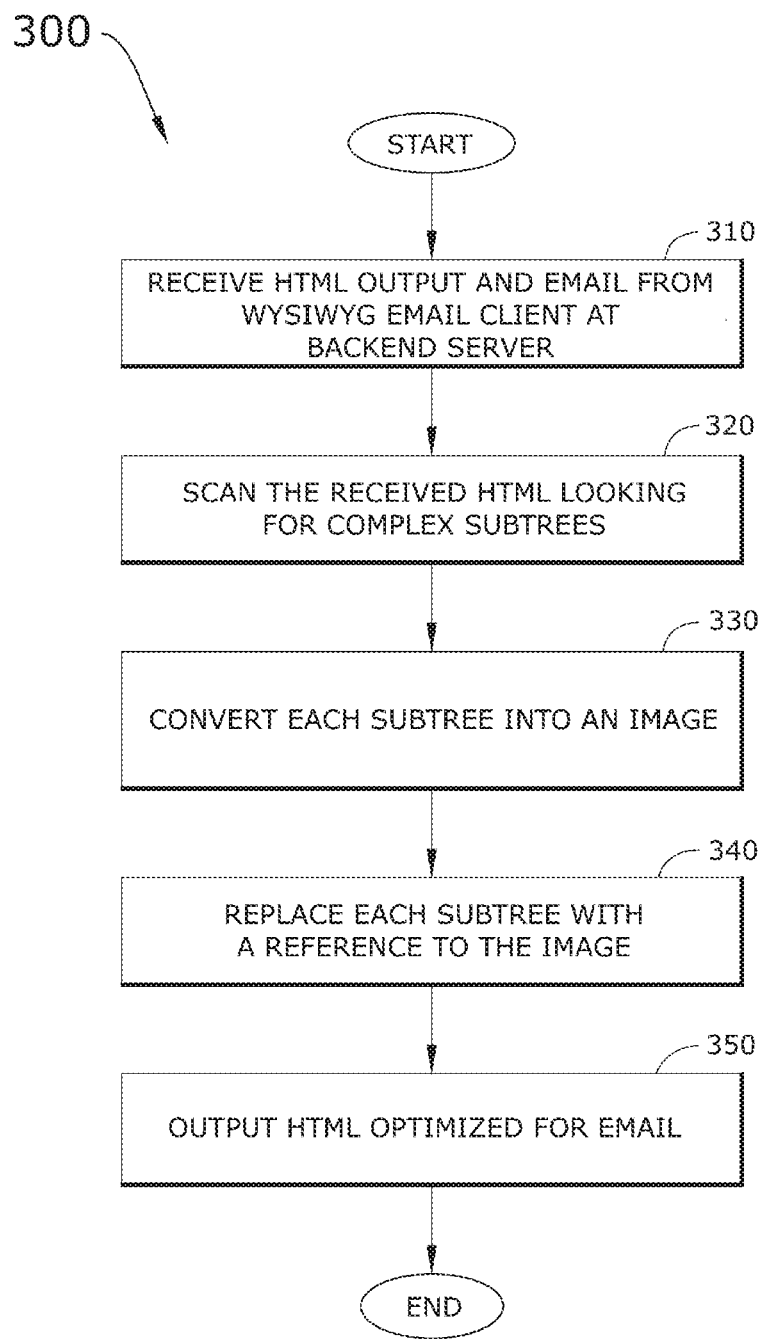
FIG. 3 conceptually illustrates a high level backend server process for scanning an HTML tree to identify a complex subtree, convert to an image, and replace the complex subtree with a reference to the image in some embodiments.
Figure 4:
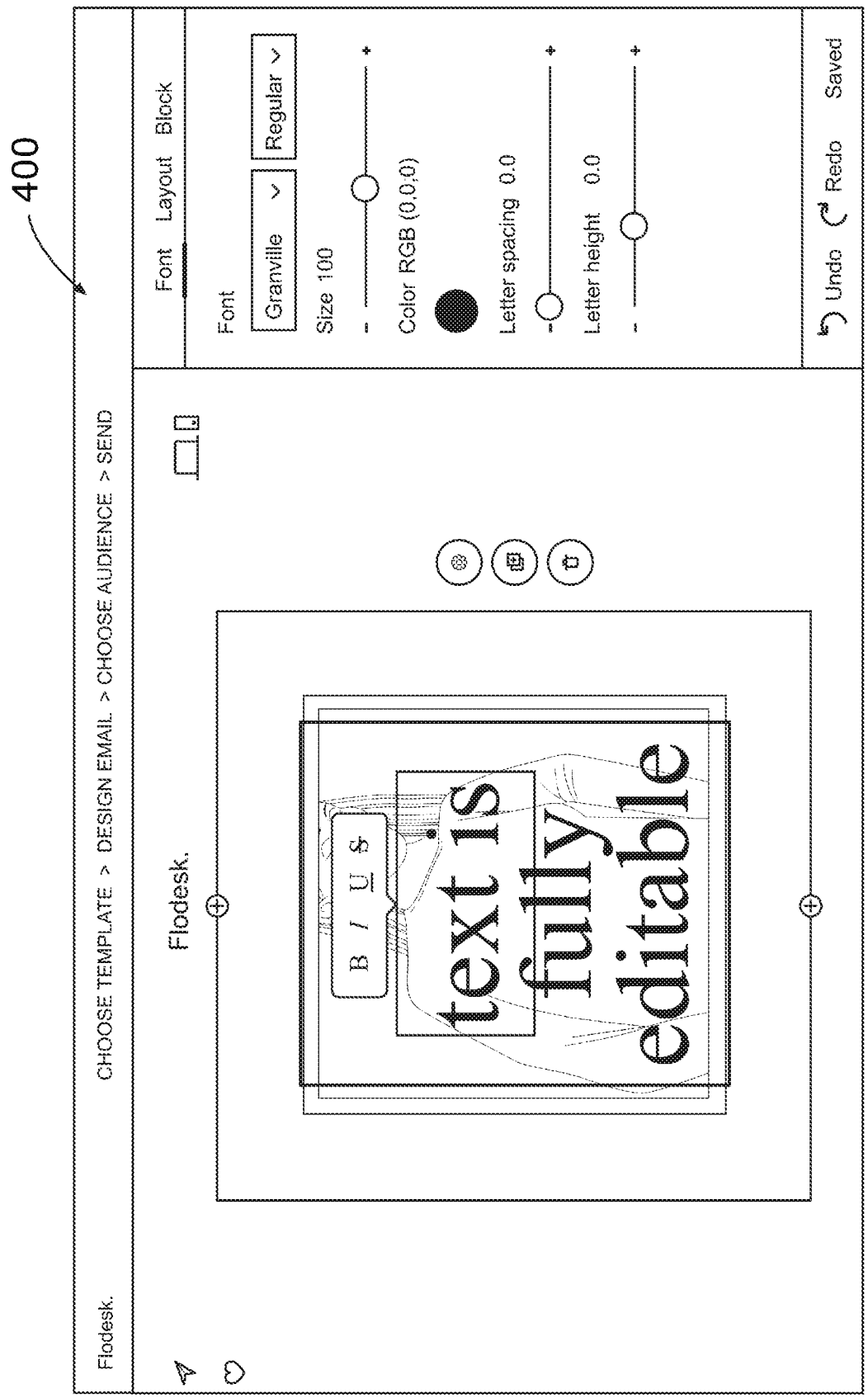
FIG. 4 conceptually illustrates an editor user interface (UI) of a software application that is used to create emails with complex graphics and customized web fonts in some embodiments.
Figure 5:
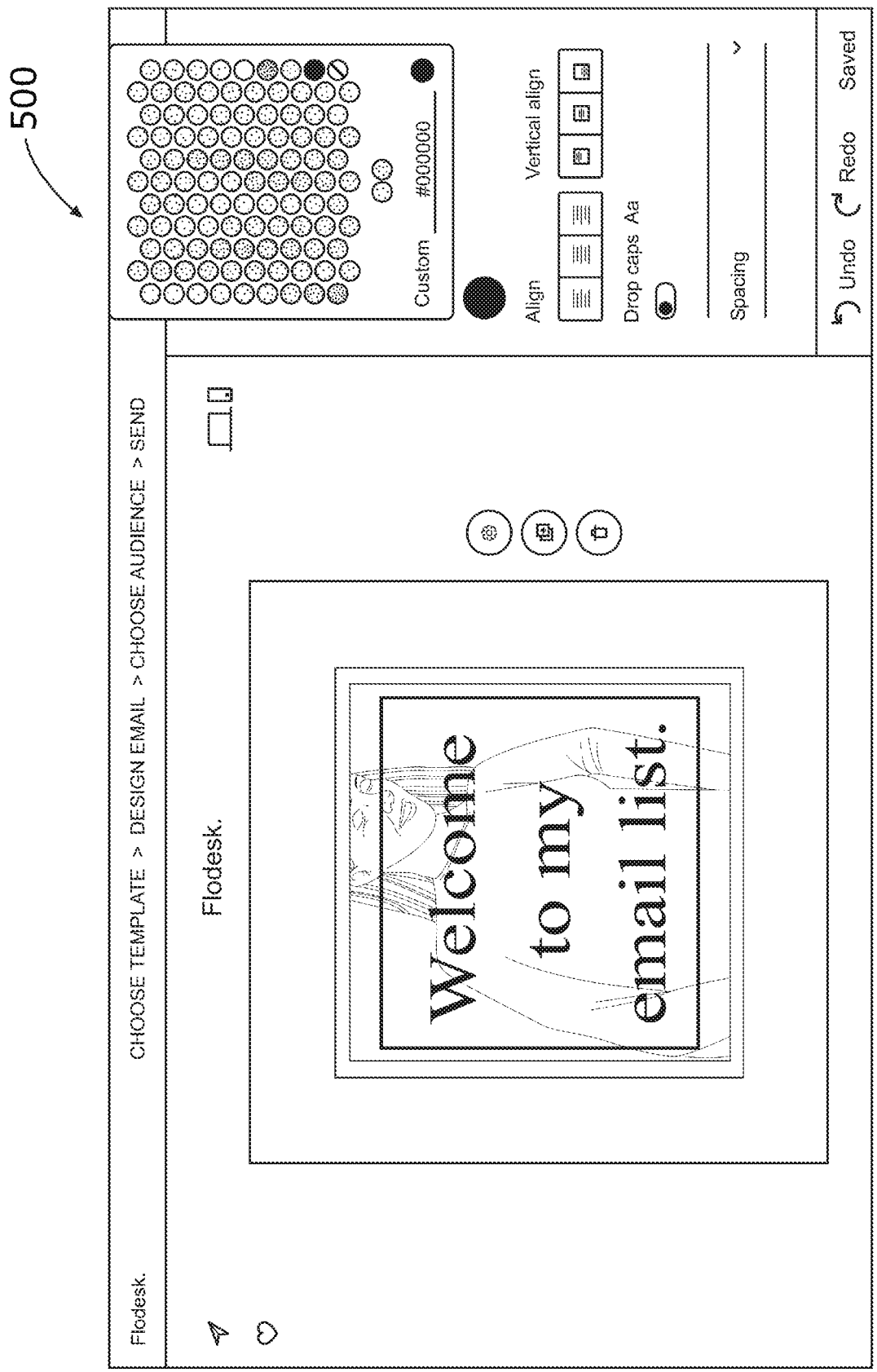
FIG. 5 conceptually illustrates a color selection tool in the editor UI of the software application that is used to create emails with complex graphics and customized web fonts in some embodiments.
Figure 6:
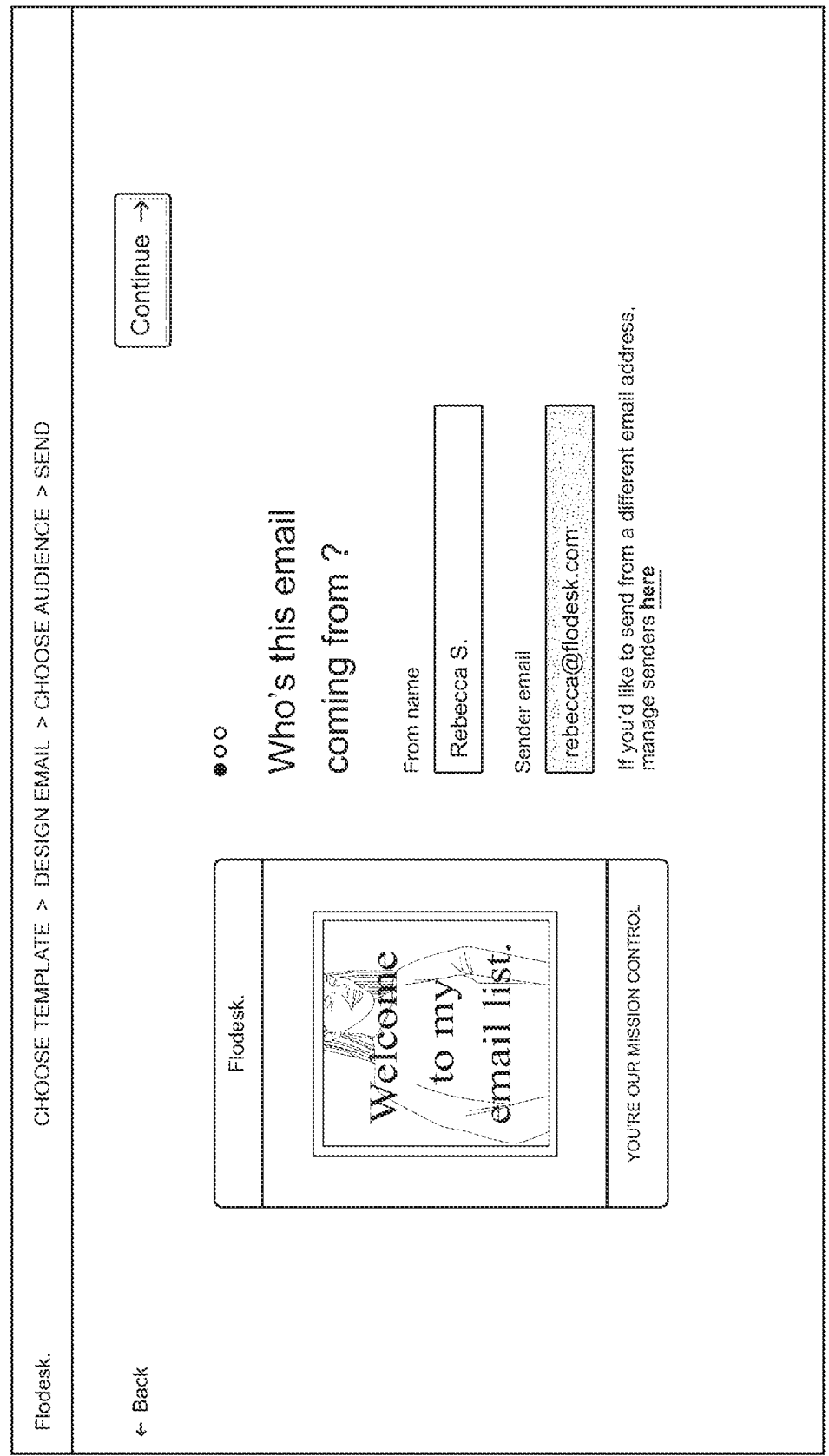
FIG. 6 conceptually illustrates a sender input tool of an email audience configuration UI of the software application that is used to configure email delivery options in some embodiments.
Figure 7:
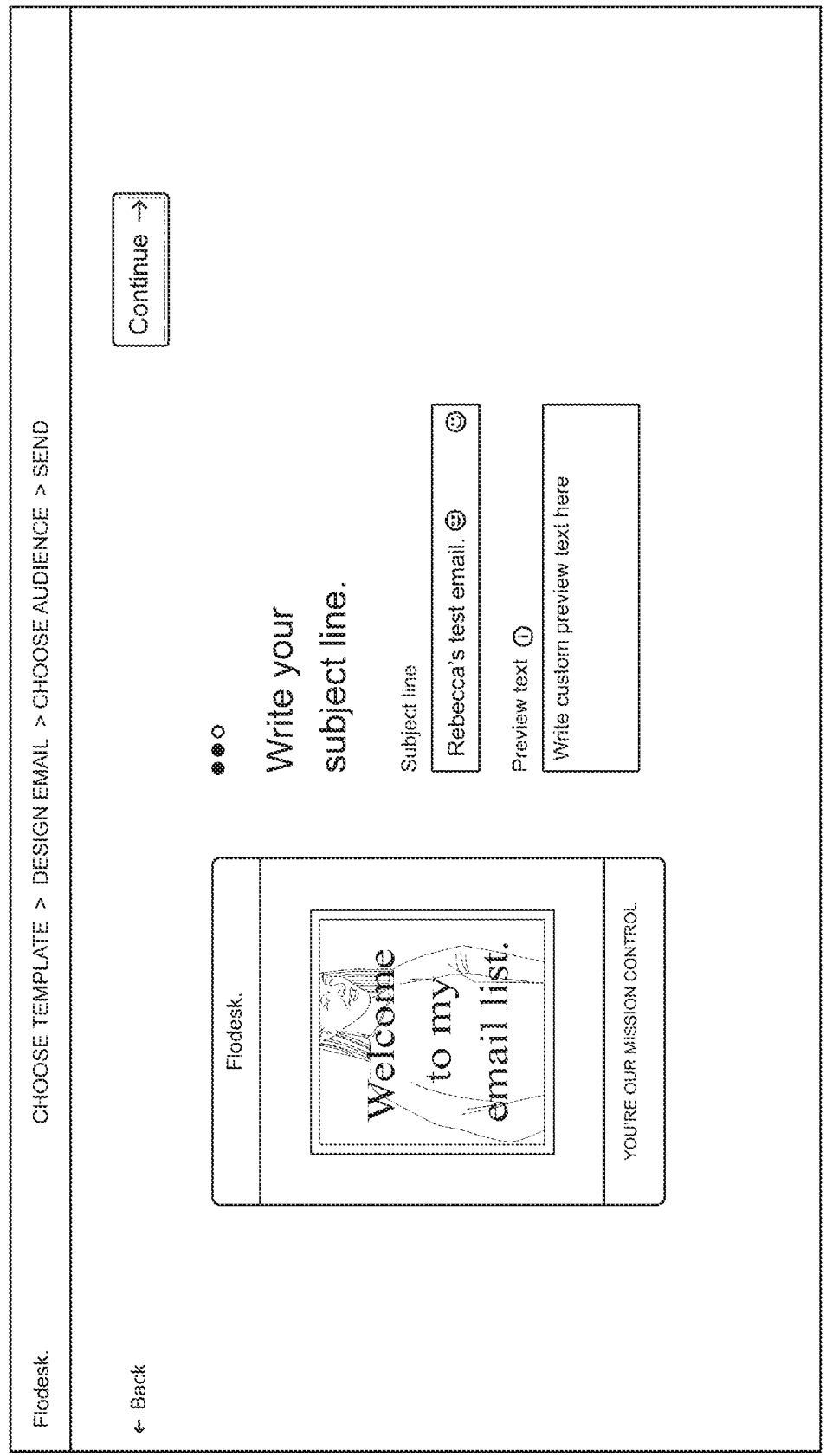
FIG. 7 conceptually illustrates a subject input tool of the email audience configuration UI of the software application that is used to configure email delivery options in some embodiments.
Figure 8:
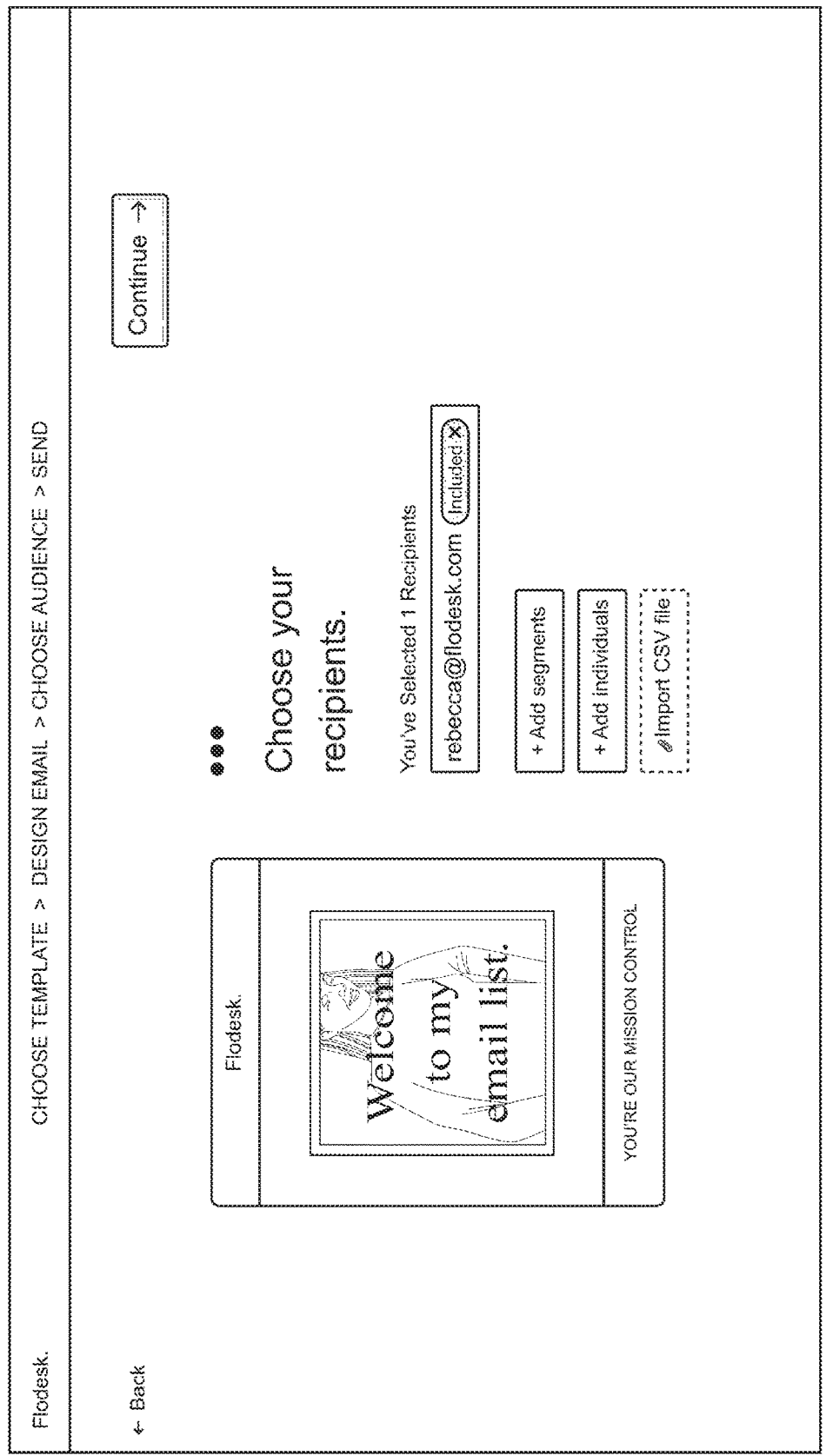
FIG. 8 conceptually illustrates a recipient input entry tool of the email audience configuration UI of the software application that is used to configure email delivery options in some embodiments.
Figure 9:
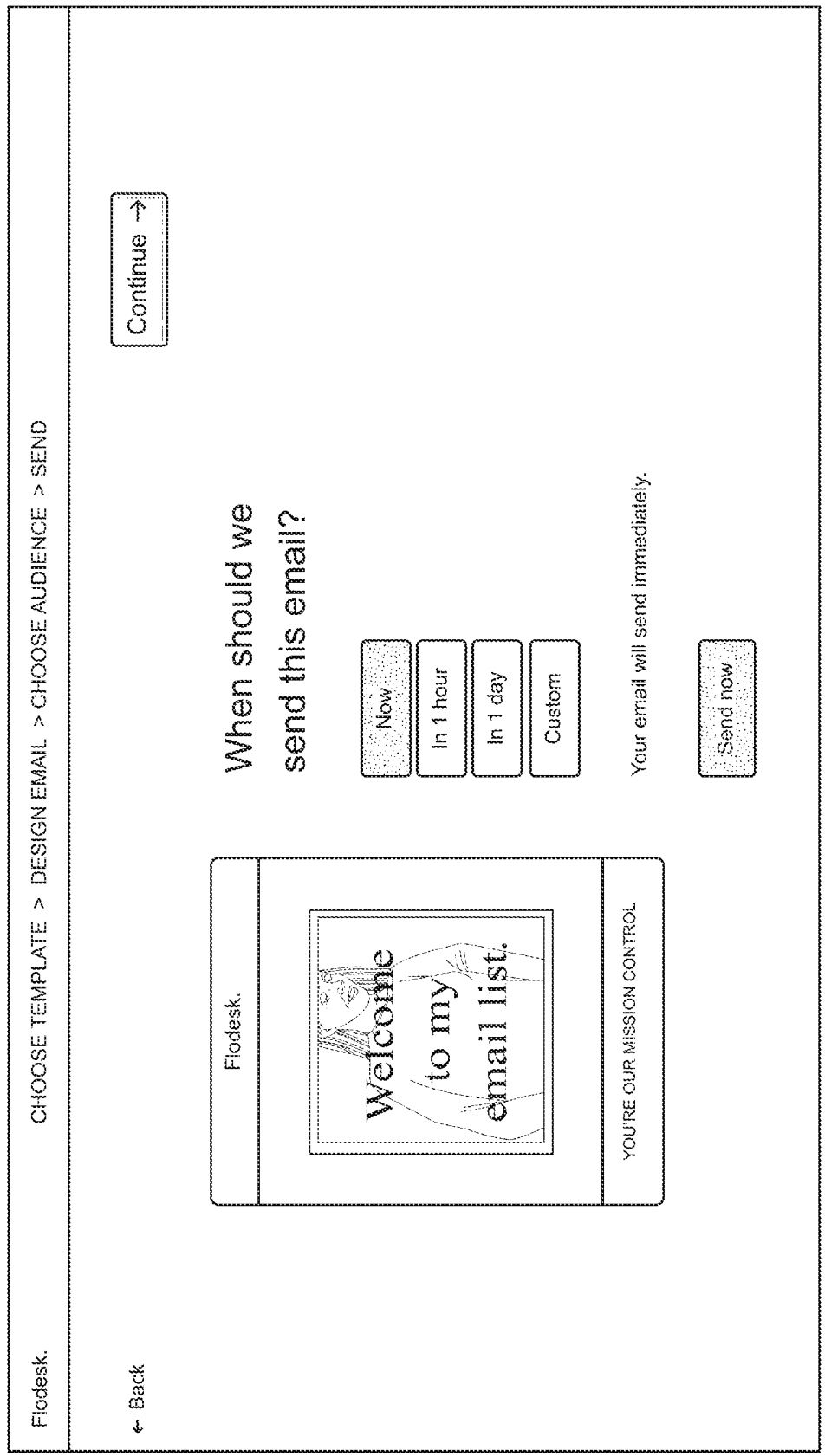
FIG. 9 conceptually illustrates an email send UI of the software application that is used to configure email delivery options in some embodiments.

In some embodiments, the step for providing (at 230) the HTML output and the email to a backend server for processing involves several sub-steps, which are described by reference to FIG. 3. Specifically, FIG. 3 conceptually illustrates a high level backend server process for scanning an HTML tree to identify a complex subtree, convert to an image, and replace the complex subtree with a reference to the image 300. As shown in this figure, the high level backend server process for scanning an HTML tree to identify a complex subtree, convert to an image, and replace the complex subtree with a reference to the image 300 starts upon receiving (at 310) the HTML output and the email from the WYSIWYG email client at the backend server. After receiving the HTML output and email, the high level backend server process for scanning an HTML tree to identify a complex subtree, convert to an image, and replace the complex subtree with a reference to the image 300 of some embodiments scans (at 320) the received HTML. While scanning, the high level backend server process for scanning an HTML tree to identify a complex subtree, convert to an image, and replace the complex subtree with a reference to the image 300 looks for complex subtrees in the HTML tree of the HTML output. Next, the high level backend server process for scanning an HTML tree to identify a complex subtree, convert to an image, and replace the complex subtree with a reference to the image 300 converts (at 330) each subtree into an image. This is done, for example, by rendering the subtree element as an image, capturing the image (by screenshot), and then saving the captured screenshot or image as a flat, raster type image. An example of a raster image is a JPEG, GIG or BMP image. In some embodiments, the high level backend server process for scanning an HTML tree to identify a complex subtree, convert to an image, and replace the complex subtree with a reference to the image 300 continues forward by replacing (at 340) each subtree with a reference to the image it just captured and converted into (or saved as) a rasterized image. Finally, the high level backend server process for scanning an HTML tree to identify a complex subtree, convert to an image, and replace the complex subtree with a reference to the image 300 outputs (at 350) the HTML optimized for email, which then gets sent on to the email delivery service for distribution to the intended recipients.

By way of example, FIGS. 4-9 conceptually illustrate user interfaces of an email client application that includes a WYSIWYG editor for creating emails with complex graphics and customized web fonts that are ensured to render consistently across multiple platforms. Specifically, FIG. 4 conceptually illustrates an editor user interface (UI) 400 of a software application that is used to create emails with complex graphics and customized web fonts. In another view, FIG. 5 conceptually illustrates a color selection tool 500 in the editor UI of the software application that is used to create emails with complex graphics and customized web fonts. Another example shown in FIG. 6 conceptually illustrates a sender input tool 600 of an email audience configuration UI of the software application that is used to configure email delivery options. Next, FIG. 7 conceptually illustrates a subject input tool 700 of the email audience configuration UI of the software application that is used to configure email delivery options. This is followed by FIG. 8, which conceptually illustrates a recipient input entry tool 800 of the email audience configuration UI of the software application that is used to configure email delivery options in some embodiments. As a final UI example, FIG. 9 conceptually illustrates an email send user interface 900 of the software application that is used to configure email delivery options. When the user presses a "Send" button (or "Send now" button, as shown in this figure), embodiments of the backend server of the system and the method for creating emails with complex graphics and customized web fonts that are ensured to render consistently across multiple platforms and email clients automatically scan for and internally flags HTML elements that have a risk of being rendered differently by different email clients. Such elements may include, without limitation, those requiring non-standard or customized fonts, and collages of graphical elements whose positional relationship to one another needs to be maintained. The HTML is then submitted to the back-end software processor for further processing and subsequent email delivery. In some embodiments, the scanning and flagging of the HTML elements is done only at the backend server, after the email client application produces HTML output of the email. In some embodiments, the backend server renders the flagged HTML subtrees in a browser application, and takes screenshots of these renderings. The screen-shots are then converted into image files, and the flagged HTML elements are replaced by image elements that refer to the image files. If the original flagged HTML is clickable to direct a reader to a different part of the email or to an external web page, the replacement HTML element is given attributes to have the same effect. Once the email has been processed as outlined above, it is ready for delivery using an email delivery service.

As mentioned above, some implementations of the process for creating emails with complex graphics and customized web fonts that are ensured to render consistently across multiple platforms involve building or integrating a WYSIWYG client software application ("WYSIWYG editor") allowing a user to compose an email with text, custom fonts, and/or complex graphical imagery. However, in some embodiments, importing HTML that was previously composed in a different, separate product is also possible. In either case, the manner of converting the HTML to produce HTML optimized for email involves scanning the HTML and flagging subtrees in the HTML. In some embodiments, the HTML Document Object Model (DOM) is the starting point for scanning the HTML to search for and flag complex HTML subtrees whose rendering may depend on which browser or email client it is viewed from.

Also, any email client/WYSIWYG editor software application implementation of the process for creating emails with complex graphics and customized web fonts that are ensured to render consistently across multiple platforms depends on backend logic that is performed by the backend server when the email is composed and ready to be sent. Using the flagging information, those HTML subtrees that have the potential of not being properly rendered across devices, operating systems, and email clients are converted to raster images by the backend server, which then replaces the flagged subtrees with subtrees of the converted raster images. In some embodiments, the conversion logic includes rendering a flagged HTML subtree in a backend browser, or other HTML rendering software, and capturing the rasterized screen image (i.e., taking a screenshot of the image). The HTML subtree is then altered (or replaced) to refer to this image.

Figure 10:
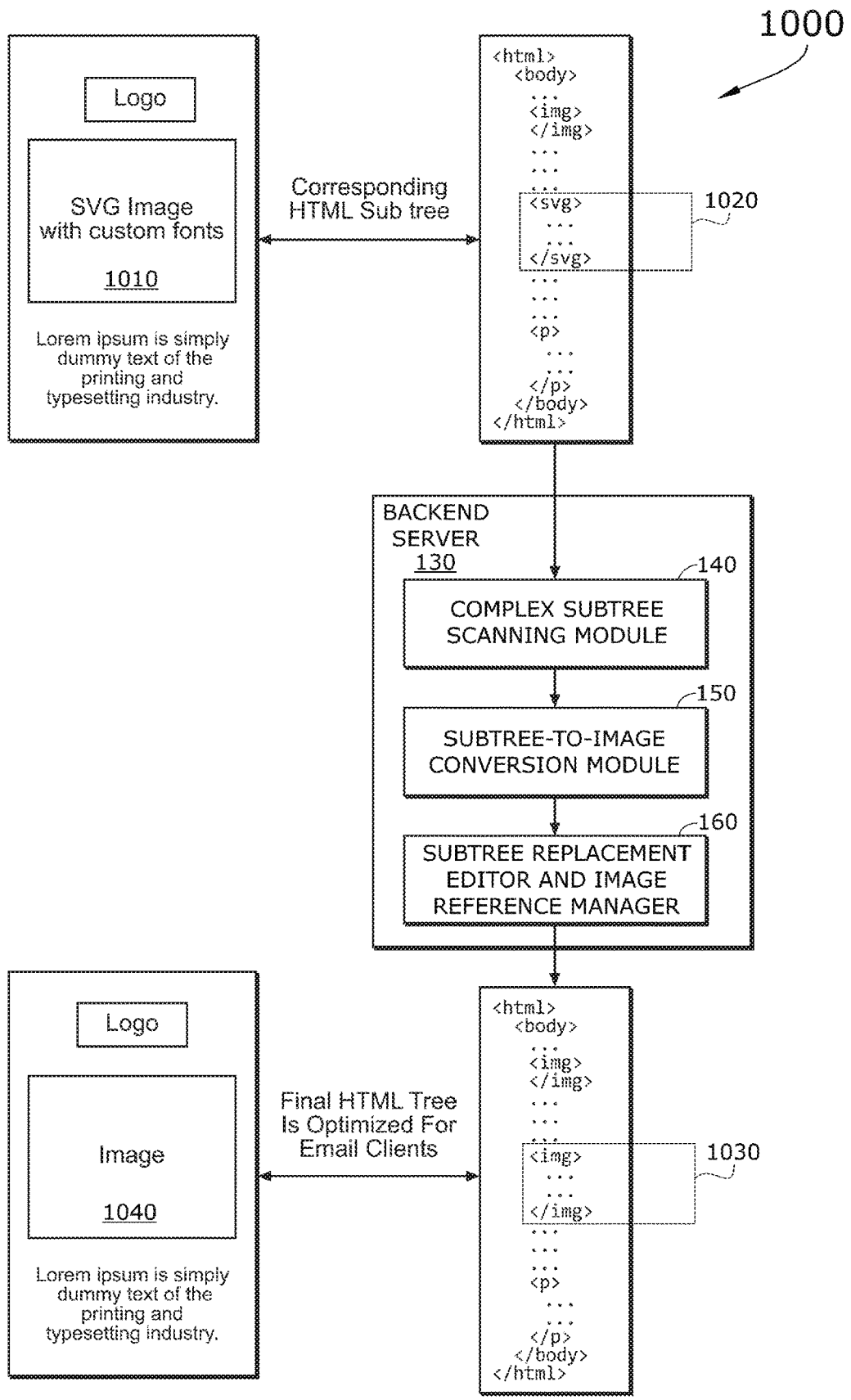
FIG. 10 conceptually illustrates a schematic diagram of backend logic performed by a backend server to process HTML of an email with complex vector graphics imagery and customized web fonts and output HTML optimized for email that renders consistently across several platforms in some embodiments.

By way of example, FIG. 10 conceptually illustrates a schematic diagram of the backend logic 1000 performed by the backend server to process HTML of an email with complex vector graphics imagery and customized web fonts and output HTML optimized for email that renders consistently across several platforms. As shown in this figure, a complex scalable vector graphics (SVG) image with custom fonts 1010 is included in a composed email with a logo and other text. Corresponding to the composed email with the SVG image with custom fonts 1010, the logo, and the other text is HTML DOM (or "HTML tree") for the email. The HTML tree includes an HTML subtree 1020 that corresponds to the SVG image with customer fonts 1010. After the email is composed, the corresponding HTML tree with the corresponding HTML subtree 1020 is sent to the backend server 130 which begins performing the backend logic by way of the complex subtree scanning module 140 to scan the HTML tree and flag the HTML subtree 1020. This is followed by the subtree-to-image conversion module 150 which renders an image of the SVG image with custom fonts 1010 according to the flagged subtree code of the corresponding HTML subtree 1020. Rendering of the image of the SVG image with custom fonts 1010 may be done in a backend browser that runs on the backend server 130 or by another HTML rendering engine or application. Upon full rendering of the image of the SVG image with custom fonts 1010, the subtree-to-image conversion module 150 captures the image by taking a screenshot of the rendered image. The image as captured is a raster image. After the image is captured, the backend server 130 triggers the subtree replacement editor and image reference manager 160 to update or replace the HTML subtree 1020 with HTML subtree 1030. In particular, the HTML subtree 1030 is shown as having different DOM code, which now references the captured image instead of the SVG image with customer fonts 1010. After replacing the HTML subtree 1020 with the image-referencing HTML subtree 1030, the final HTML tree is optimized for email which will consistently render the replacement, image-referencing HTML subtree 1030 and display the image 1040 in the email across virtually all email client applications, no matter the platform or device.

In some embodiments, the backend server 130 performs the conversion by carrying out the steps of a backend server process for updating HTML of an email with a complex graphics subtree and outputting HTML optimized for email. In some embodiments, the backend server process for updating HTML of an email with a complex graphics subtree and outputting HTML optimized for email is implemented as a backend server software application that incorporates or externally directs the complex subtree scanning module 140, the subtree-to-image conversion module 150, and the subtree replacement editor and image reference manager 160. Together, the backend server software application, the complex subtree scanning module 140, the subtree-to-image conversion module 150, and the subtree replacement editor and image reference manager 160 provide a software application web service (or a software-as-a-service "SaaS" web application) hosted on the backend server to which an email client application with WYSIWYG editor connects to convert emails with complex graphical elements that may include customized fonts and other non-standard rendering elements into emails that render consistently across virtually all email client applications on any platform or device. An example of such a backend server process for updating HTML of an email with a complex graphics subtree and outputting HTML optimized for email is described next, by reference to FIG. 11.

Figure 11:
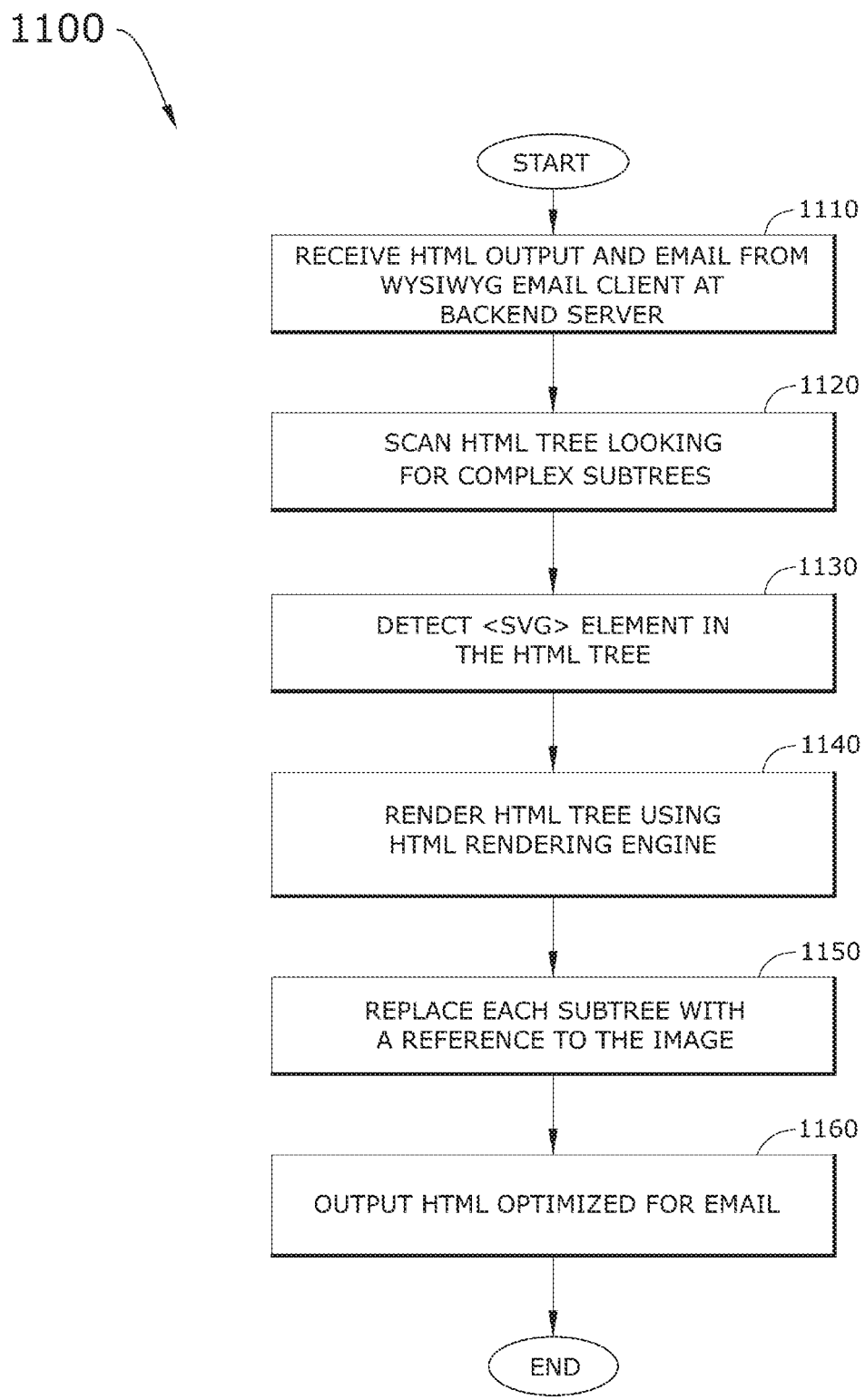
FIG. 11 conceptually illustrates a detailed backend server process for updating HTML of an email with a complex graphics subtree and outputting HTML optimized for email in some embodiments.

Specifically, FIG. 11 conceptually illustrates a detailed backend server process for updating HTML of an email with a complex graphics subtree and outputting HTML optimized for email 1100. The detailed backend server process for updating HTML of an email with a complex graphics subtree and outputting HTML optimized for email 1100 may be performed by a backend server software application running on the backend server. As shown in this figure, the detailed backend server process for updating HTML of an email with a complex graphics subtree and outputting HTML optimized for email 1100 starts by receiving (at 1110) HTML output and email from a WYSIWYG email client application. As noted above, the HTML output of the composed email may be from an email client or from an external application that created the HTML (therefore, not limited to a WYSIWYG email client application only).

When the backend server receives the HTML output of the email, the detailed backend server process for updating HTML of an email with a complex graphics subtree and outputting HTML optimized for email 1100 scans (at 1120) the HTML tree (or HTML DOM) of the received HTML output. Scanning the HTML tree involves looking for complex subtrees within the overall HTML tree, such as subtrees denoted by an <SVG> element that represents a complex subtree for a scalable vector graphics image which may include customized fonts. In some embodiments, when the HTML output references a scalable vector graphics image, then the HTML tree may include such an <SVG> element. Therefore, when the detailed backend server process for updating HTML of an email with a complex graphics subtree and outputting HTML optimized for email 1100 detects (at 1130) an <SVG> element in the HTML tree, the detailed backend server process for updating HTML of an email with a complex graphics subtree and outputting HTML optimized for email 1100 also searches for a corresponding closing tag </SVG> that denotes the end-point of the subtree.

Next, the detailed backend server process for updating HTML of an email with a complex graphics subtree and outputting HTML optimized for email 1100 of some embodiments renders (at 1140) the HTML tree using an HTML rendering engine (or a backend browser that runs on the backend server). When the HTML tree is rendered, the rendered image associated with the detected <SVG> element is captured by screenshot. In some embodiments, the screenshot image is saved or converted to a raster image format, such as a JPEG, GIF, or BMP image. In some embodiments, the detailed backend server process for updating HTML of an email with a complex graphics subtree and outputting HTML optimized for email 1100 then replaces (at 1150) the subtree of each detected <SVG> element with a reference to the corresponding rasterized image. After replacing the subtree(s), the detailed backend server process for updating HTML of an email with a complex graphics subtree and outputting HTML optimized for email 1100 of some embodiments outputs (at 1160) the HTML optimized for email. Then the detailed backend server process for updating HTML of an email with a complex graphics subtree and outputting HTML optimized for email 1100 ends.

While the detailed backend server process for updating HTML of an email with a complex graphics subtree and outputting HTML optimized for email 1100 demonstrates scanning and detecting of one <SVG> element in the HTML tree, it should be understood that emails composed by way of, or in connection with, a WYSIWYG editor may include multiple complex graphical elements, including multiple scalable vector graphics and a variety of non-standard custom fonts, with layering and positioning that may be complex. An example of a backend server process for updating HTML of an email with multiple complex graphics subtree and outputting HTML optimized for email is described next, by reference to FIG. 12.

Figure 12:
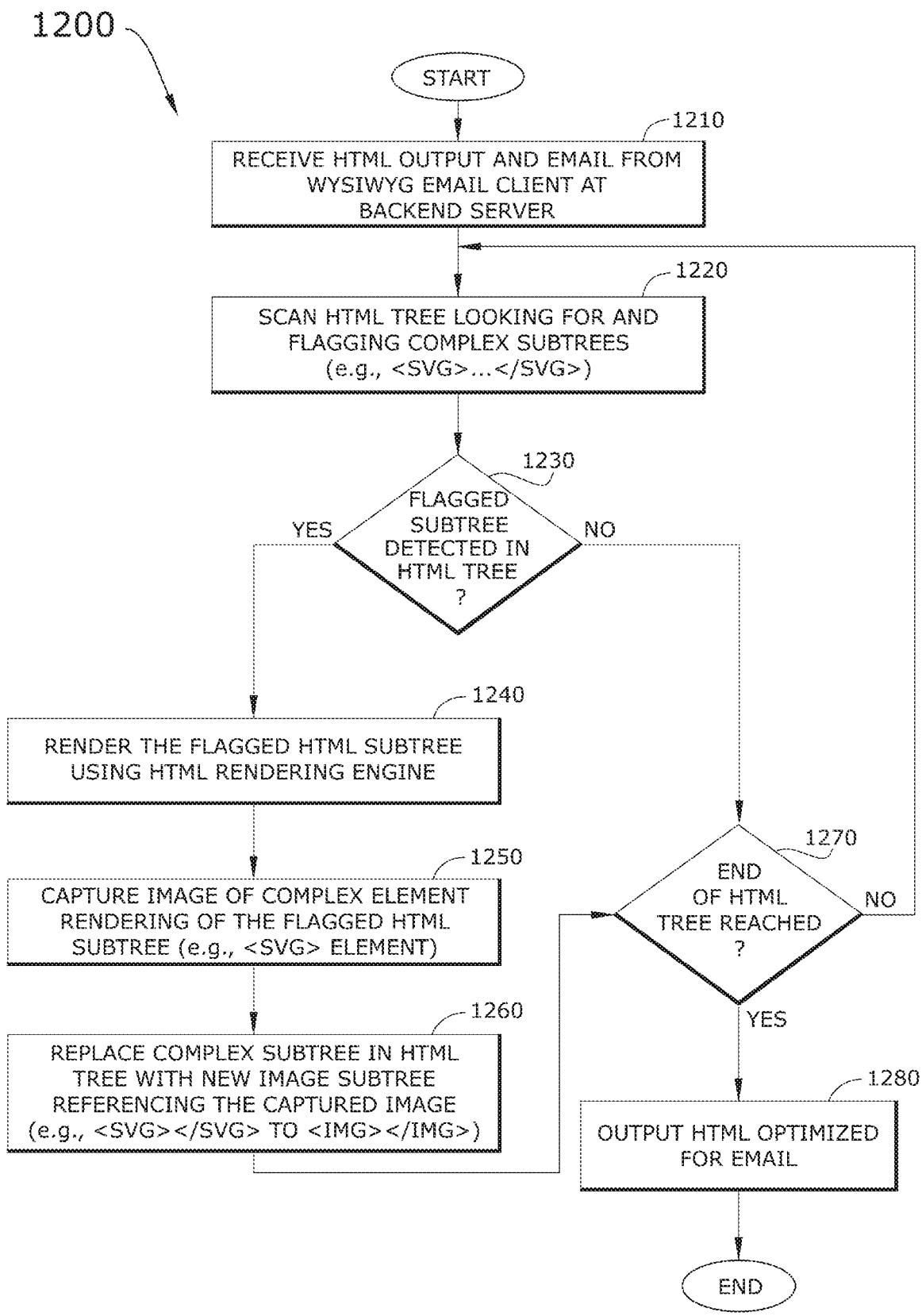
FIG. 12 conceptually illustrates a detailed backend server multi-graphics email process for updating HTML with multiple complex graphics subtrees and outputting HTML optimized for email in some embodiments.

In particular, FIG. 12 conceptually illustrates a detailed backend server multi-graphics email process for updating HTML with multiple complex graphics subtrees and outputting HTML optimized for email 1200. The detailed backend server multi-graphics email process for updating HTML with multiple complex graphics subtrees and outputting HTML optimized for email 1200 may be performed by a backend server HTML tree processing software application, which incorporates and/or directs several backend server modules and sub-modules, processing engines, processing managers, and other processing units. An example of a backend server with several backend server modules and sub-modules, processing engines, processing managers, and other processing units is described below, by reference to FIG. 13. However, as shown in FIG. 12, the detailed backend server multi-graphics email process for updating HTML with multiple complex graphics subtrees and outputting HTML optimized for email 1200 starts by receiving (at 1210) HTML output of a composed email from a WYSIWYG email client application. Next, the detailed backend server multi-graphics email process for updating HTML with multiple complex graphics subtrees and outputting HTML optimized for email 1200 scans (at 1220) the HTML tree (of the HTML output) looking for and flagging complex subtrees. Examples of complex subtrees that are flagged are those which reference scalable vector graphics, denoted by <SVG> . . . </SVG> subtree elements, or other such complex subtrees which reference complex graphical elements that may include customized, non-standard fonts, particular image layouts or collages, or blended imagery and customized fonts.

In some embodiments, the detailed backend server multi-graphics email process for updating HTML with multiple complex graphics subtrees and outputting HTML optimized for email 1200 scans the HTML tree until a complex subtree is detected, then flags the complex subtree and continues forward with processing of the complex subtree to update the HTML tree with HTML optimized for email, which is described further below. However, in some other embodiments, before further processing and conversion of complex graphical elements occurs, the detailed backend server multi-graphics email process for updating HTML with multiple complex graphics subtrees and outputting HTML optimized for email 1200 scans through the entire HTML tree and flags any/all of the detected complex subtrees it finds. In this manner, the detailed backend server multi-graphics email process for updating HTML with multiple complex graphics subtrees and outputting HTML optimized for email 1200 of some embodiments scans the HTML tree until any subtree element is detected. When a subtree element is detected, the detailed backend server multi-graphics email process for updating HTML with multiple complex graphics subtrees and outputting HTML optimized for email 1200 pauses the scanning, saves a scan position in the HTML tree, and considers whether the detected subtree is a complex subtree to flag for further processing. When the detected subtree is a complex subtree (of the type referencing complex graphical elements and/or customized fonts), the detailed backend server multi-graphics email process for updating HTML with multiple complex graphics subtrees and outputting HTML optimized for email 1200 flags (at 1220) the HTML subtree and returns to scanning the remaining HTML tree from the saved scan position, flagging each HTML subtree that is detected as a complex subtree.

Now referring to embodiments of the detailed backend server multi-graphics email process for updating HTML with multiple complex graphics subtrees and outputting HTML optimized for email 1200 which performing HTML updating operations upon detecting a complex subtree. In some embodiments, the detailed backend server multi-graphics email process for updating HTML with multiple complex graphics subtrees and outputting HTML optimized for email 1200 determines (at 1230) whether the scanning operation detected a subtree that was flagged as a complex subtree or determined not be a complex subtree of the type intended for updating/replacement. When the subtree detected during the scan is not a flagged subtree detected in the HTML tree, then the detailed backend server multi-graphics email process for updating HTML with multiple complex graphics subtrees and outputting HTML optimized for email 1200 proceeds to the next step of determining (at 1270) whether the end of the HTML tree has been reached. When the end of the HTML tree has not been reached, the detailed backend server multi-graphics email process for updating HTML with multiple complex graphics subtrees and outputting HTML optimized for email 1200 returns to the step for scanning (at 1220) the HTML tree at the saved scan position, looking for and flagging complex subtrees.

On the other hand, when the subtree detected during the scan is determined (at 1230) to be a flagged subtree of a complex graphical element in the HTML tree, then the detailed backend server multi-graphics email process for updating HTML with multiple complex graphics subtrees and outputting HTML optimized for email 1200 renders (at 1240) the HTML tree including the flagged HTML subtree using an HTML rendering engine (or a backend browser application running on the backend server). After rendering the flagged HTML subtree in the HTML tree, the detailed backend server multi-graphics email process for updating HTML with multiple complex graphics subtrees and outputting HTML optimized for email 1200 of some embodiments captures (at 1250) a screenshot image of the complex graphical element as rendered according to the flagged HTML subtree of the HTML tree. Being a screenshot image, the captured image is a raster image, such as a JPEG image, a GIF image, or a bitmap (BMP) image, which is a pixel-based raster image, not a scalable vector graphics image. In some embodiments, the detailed backend server multi-graphics email process for updating HTML with multiple complex graphics subtrees and outputting HTML optimized for email 1200 then replaces (at 1260) the complex subtree in the HTML tree with a replacement HTML subtree generated based on the new captured image. The replacement HTML subtree includes a reference to the newly capture raster image, and the overall HTML tree is updated with the replacement HTML subtree replacing the flagged HTML subtree.

After replacing the flagged HTML subtree in the overall HTML tree with the replacement HTML subtree that references the image, the detailed backend server multi-graphics email process for updating HTML with multiple complex graphics subtrees and outputting HTML optimized for email 1200 of some embodiments determines (at 1270) whether the end of the overall HTML tree has been reached. When the end of the overall HTML tree has been not been reached, the detailed backend server multi-graphics email process for updating HTML with multiple complex graphics subtrees and outputting HTML optimized for email 1200 returns to the step for scanning (at 1220) the HTML tree, continuing from the saved scan position and continuing to look for and flag any other complex subtrees in the HTML tree. However, when the end of the overall HTML tree has affirmatively been reached, the detailed backend server multi-graphics email process for updating HTML with multiple complex graphics subtrees and outputting HTML optimized for email 1200 then outputs (at 1280) HTML optimized for email. Then the detailed backend server multi-graphics email process for updating HTML with multiple complex graphics subtrees and outputting HTML optimized for email 1200 ends.

To make the methods for creating emails with complex graphics and customized web fonts that are ensured to render consistently across multiple platforms and email clients and the systems that ensure consistent rendering of created emails with complex graphics and customized web fonts by automatically transforming, completely transparently, the contents of each created email to a form that renders properly across all email clients of the present disclosure, a developer may implement the methods/processes as software applications or software components and set up system components for deployment. Knowledge of the manner in which client-based and browser-based email clients from different vendors, or which use different versions of HTML, render HTML-based emails may be employed in each software application implementation or system deployment. In this way, it is possible to determine which HTML subtrees need to be flagged while scanning the HTML tree. Note that the methods, processes, and system described in this specification do not intend to produce a single, all-encompassing image of the entire email composed by the user, but rather, to specifically identify complex graphical elements which may include custom, non-standard fonts, in which to replace corresponding HTML subtree elements with references to raster images that render consistently across virtually all email clients on any platform or device. In other words, the functions of the methods, processes, and/or systems described in this specification do not suffice to simply create an "all image" email, as that would preclude having multiple clickable images, or other actions associated with HTML elements. Also, a WYSIWYG editor is optional, but desirable. When a WYSIWYG editor is incorporated into an email client application, such as the WYSIWYG editor incorporated into the UI of the software application described above by reference to FIGS. 4-9, composition of emails with complex graphical elements which may include non-standard, customized fonts and styles may be easier for a user to utilize than it is for the user to run two separate software applications in which one is the email client and the other is the WYSIWYG editor, or easier than importing, into the email client application, scalable vector graphics with custom fonts and styles, or importing (into the email client) other complex graphical elements with custom fonts.

To use the methods for creating emails with complex graphics and customized web fonts that are ensured to render consistently across multiple platforms and email clients and the systems that ensure consistent rendering of created emails with complex graphics and customized web fonts by automatically transforming, completely transparently, the contents of each created email to a form that renders properly across all email clients of the present disclosure, a user may run a dedicated software application (with a WYSIWYG editor incorporated or without a WYSIWYG editor incorporated, but a separate WYSIWYG editor application running, or by importing of the complex graphical elements and/or customized, non-standard fonts and styles) or run a browser-based application, preferably operating in a WYSIWYG manner, to create an email which may include rich text (using standard or non-standard web fonts), complex graphical elements, such as graphics collages (which may layer or arrange multiple overlapped images), animated GIFs, and other HTML elements, such as buttons, selectable lists, text input fields, or other input areas. After composing the email, the user would press a button to have it sent out to recipients on one or more mailing lists. For example, the "Send now" button described above by reference to FIG. 9. In an email marketing product, the user would typically have lists associated with different market segments, and would choose the desired segment(s) prior to having the email sent out. For example, the recipient selection tool described above by reference to FIG. 8. The product could also allow the user to define a sequence of emails, wherein emails are automatically sent out at predefined time intervals, or in response to actions (such as clicking on an image or a button) that a user takes after receiving an email. After the user makes all email composition changes/updates, and selects all email delivery and configuration options, and upon the user selecting to send the email, the HTML of the composed email is sent to the backend server for the vital processing steps of scanning the HTML tree, identifying the complex subtrees that need replacement, and replacing those complex subtrees to provide HTML optimized for email that is ensured to render across virtually all email clients on any platform or device.

Figure 13:
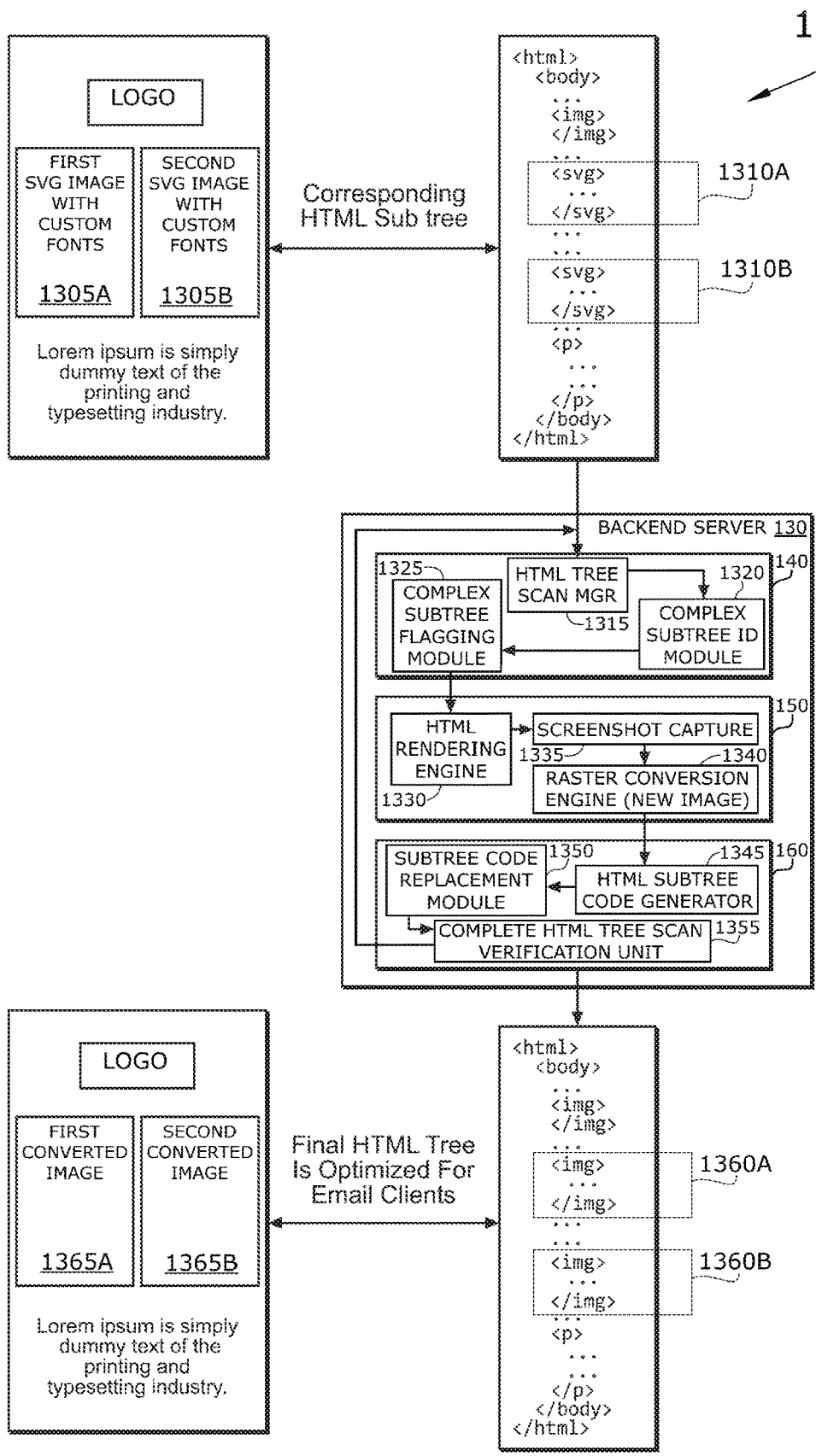
FIG. 13 conceptually illustrates a detailed schematic diagram of a backend system that processes HTML of an email with multiple complex vector graphics images and customized web fonts and outputs HTML optimized for email that renders consistently across several platforms in some embodiments.

These vital processing steps of scanning the HTML tree, identifying the complex subtrees that need replacement, and replacing those complex subtrees to provide HTML optimized for email that is ensured to render across virtually all email clients on any platform or device are described next in connection with FIG. 13, which conceptually illustrates a detailed schematic diagram of a backend system that processes HTML of an email with multiple complex vector graphics images and customized web fonts and outputs HTML optimized for email that renders consistently across several platforms 1300. As shown in this figure, the backend system that processes HTML of an email with multiple complex vector graphics images and customized web fonts and outputs HTML optimized for email that renders consistently across several platforms 1300 starts with a composed email that includes a logo, textual content, a first complex scalable vector graphics image with custom fonts 1305A, and a second complex scalable vector graphics image with custom fonts 1305B. HTML output of the composed email includes corresponding HTML subtrees for the complex graphical images with custom fonts, namely, a first complex HTML subtree 1310A that corresponds to the first complex scalable vector graphics image with custom fonts 1305A and a second complex HTML subtree 1310B that corresponds to the second complex scalable vector graphics image with custom fonts 1305B.

In some embodiments, the backend system that processes HTML of an email with multiple complex vector graphics images and customized web fonts and outputs HTML optimized for email that renders consistently across several platforms 1300 includes the backend server with the complex subtree scanning module 140, the subtree-to-image conversion module 150, and the subtree replacement editor and image reference manager 160. In some embodiments, the complex subtree scanning module 140 comprises an HTML tree scan manager 1315, a complex subtree identification module 1320, and a complex subtree flagging module 1325. In some embodiments, the subtree-to-image conversion module 150 comprises an HTML rendering engine 1330, a screenshot capture unit 1335, and a raster conversion engine 1340 that produces a new flat rasterized image. In some embodiments, the subtree replacement editor and image reference manager 160 comprises an HTML subtree code generator 1345, a subtree code replacement module 1350, and a complete HTML tree scan verification unit 1355.

In some embodiments, the backend system that processes HTML of an email with multiple complex vector graphics images and customized web fonts and outputs HTML optimized for email that renders consistently across several platforms 1300 works in a way that starts with the complex subtree scanning module 140 of the backend server 130 providing the HTML output (or rather, the overall HTML tree) to the HTML tree scan manager 1315 which scans the HTML tree looking for subtree code structures. When the HTML tree scan manager 1315 finds a subtree in the HTML tree, the complex subtree identification module 1320 evaluates the structure of the subtree code to determine whether the found subtree is a type of complex HTML subtree to flag for replacement. When the complex subtree identification module 1320 determines that an evaluated subtree is not the type of complex HTML subtree to flag for replacement, the HTML tree scan manager 1315 continues to scan through the HTML tree. On the other hand, when the complex subtree identification module 1320 determines that an evaluated subtree is the type of complex subtree to flag, the complex subtree flagging module 1325 flags the subtree in the HTML tree. In some embodiments, the complex subtree scanning module 140 performs scanning, subtree evaluation, and subtree flagging for the entire HTML tree before handing the HTML tree over to the subtree-to-image conversion module 150 for further processing. In some other embodiments, the complex subtree scanning module 140 hands the HTML tree over to the subtree-to-image conversion module 150 when the complex subtree flagging module 1325 flags a single subtree in the HTML tree, with the HTML tree scan manager 1315 saving a scan position at the start of the next subtree code structure after the flagged subtree in the HTML tree to continue with scanning, subtree evaluation, and subtree flagging later, after processing is completed by the subtree-to-image conversion module 150 and the subtree replacement editor and image reference manager 160.

In some embodiments, the backend system that processes HTML of an email with multiple complex vector graphics images and customized web fonts and outputs HTML optimized for email that renders consistently across several platforms 1300 continues by invoking the subtree-to-image conversion module 150, which provides the HTML tree received from the complex subtree scanning module 140 to the HTML rendering engine 1330 to render the HTML in an output format. After rendering the HTML tree, the screenshot capture unit 1335 takes a screenshot of the rendered HTML. Upon capturing the screenshot, the raster conversion engine 1340 converts the screenshot to a new rasterized image.

In some embodiments, the backend system that processes HTML of an email with multiple complex vector graphics images and customized web fonts and outputs HTML optimized for email that renders consistently across several platforms 1300 continues by invoking the subtree replacement editor and image reference manager 160, which instructs the HTML subtree code generator 1345 to generate HTML subtree code for the new rasterized image. The generated HTML subtree code is then passed to the subtree code replacement module 1350 which replaces the original flagged HTML subtree in the HTML tree with the generated HTML subtree code referencing the new rasterized image. After replacing the original flagged HTML subtree in the HTML tree, the complete HTML tree scan verification unit 1355 checks to see whether the entire HTML tree for the email has been scanned. When scanning of the HTML tree is incomplete, the complete HTML tree scan verification unit 1355 sends the updated HTML tree back to the complex subtree scanning module 140 which triggers the HTML tree scan manager 1315 to continue scanning at the saved scan position in the updated HTML tree. On the other hand, when scanning of the HTML tree is verified as completed by the complete HTML tree scan verification unit 1355, the subtree replacement editor and image reference manager 160 hands the fully updated HTML tree to the backend server 130 which then produces HTML optimized for email. As shown, the HTML optimized for email includes a fully updated HTML tree with a first raster image HTML subtree 1360A and a second raster image HTML subtree 1360B. The first raster image HTML subtree 1360A references and corresponds to a first converted image 1365A, while the second raster image HTML subtree 1360B references and corresponds to a second converted image 1365B.

While this example limits the number of complex graphical image elements with custom fonts to two complex graphical elements with custom fonts arranged side-by-side in the composed email, a person of ordinary skill in the relevant art would appreciate that many more complex graphical image elements with custom fonts could be included in the composed email, and the respective arrangement of any of the complex graphical image elements could be layered in a collage style or other manner that is different from the side-by-side arrangement style demonstrated in this figure.

In some embodiments, the system that ensures consistent rendering of emails with complex graphics and customized web fonts across several platforms is deployed as a software application service. Together, the backend server software application, the complex subtree scanning module 140, the subtree-to-image conversion module 150, and the subtree replacement editor and image reference manager 160 provide a software application web service (or a software-as-a-service "SaaS") hosted by the backend server to which an email client application with WYSIWYG editor connects to convert emails with complex graphical elements that may include customized fonts and other non-standard rendering elements into emails that render consistently across virtually all email programs on any platform or device.

Figure 14:
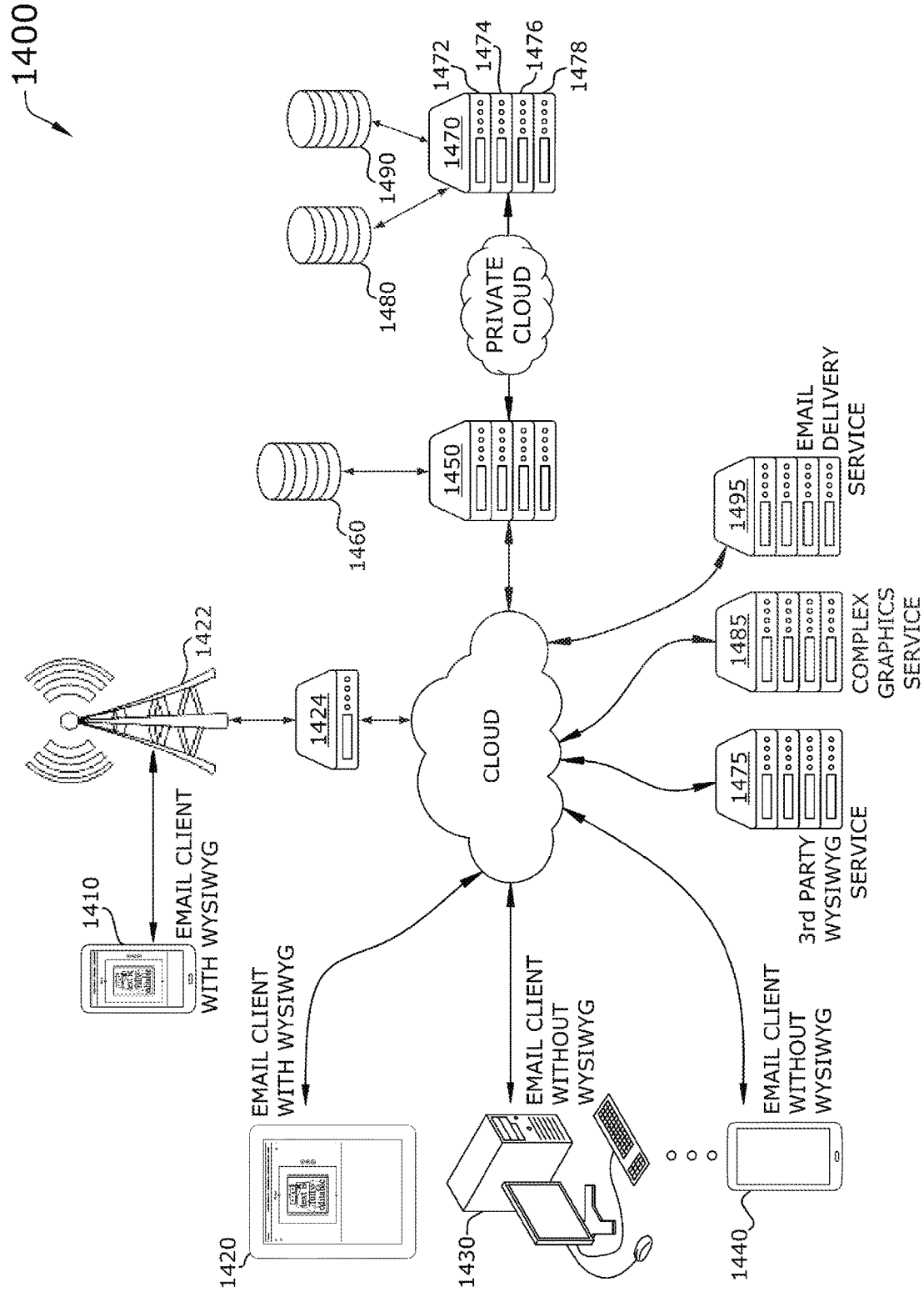
FIG. 14 conceptually illustrates a network architecture of a cloud-based system that ensures consistent rendering of emails with complex graphics and customized web fonts across several platforms in some embodiments.

By way of example, FIG. 14 conceptually illustrates a network architecture of a cloud-based system that ensures consistent rendering of emails with complex graphics and customized web fonts across several platforms 1400 (referred to as "cloud-based system 1400" in this example). The cloud-based system that ensures consistent rendering of emails with complex graphics and customized web fonts across several platforms 1400 shown in this figure hosts software application web service (or SaaS web application) for email client applications running on a variety of computing devices (e.g., mobile devices, desktop/laptop computers, etc.) to use in connection with creating emails that contain complex graphical elements and/or non-standard, customized fonts, so that the email and associated imagery and designs render consistently for all email recipients, no matter that email client application any individual recipient uses, and no matter the type of device or platform used to view the email.

As shown in this figure, the cloud-based system 1400 includes a set of email clients 1410-1440, a wireless communication point 1422 (e.g., a cell tower for cellular data communication), a gateway 1424, a set of user authentication and registration server computing devices 1450, a registered user database 1460, a backend server and backend server modules 1470, an HTML document object model (DOM) database 1480, and a secure email delivery configuration database 1490. In some embodiments, the backend server and backend server modules 1470 includes the backend server 1472, the complex subtree scanning module 1474, the subtree-to-image conversion module 1476, and the subtree replacement editor and image reference manager 1478. In some embodiments, the set of email clients 1410-1440 include a mobile device email client with a WYSIWYG editor 1410, a tablet device email client with a WYSIWYG editor 1420, a desktop computer email client without a WYSIWYG editor 1430, and another mobile device email client without a WYSIWYG editor 1440.

In some embodiments, a plurality of third party cloud services are accessible via the cloud-based system 1400. The plurality of third party cloud services shown in this figure include a third party WYSIWYG application service 1475, a third party complex graphical image and custom font creation engine 1485, and a third party email delivery service 1495. However, the plurality of third party cloud services may include more services than those shown in this figure, and are therefore understood to be exemplary and not limiting of the cloud-based system 1400. In some embodiments, the cloud-based system 1400 accesses the third party email delivery service 1495 for email delivery. For example, the third party email delivery service 1495 may deliver email with HTML optimized for the email to a plurality of designated recipients and one or more scheduled times. In some embodiments, one or more email clients 1410-1440 access any of the third party cloud services. Specifically, the desktop computer email client without a WYSIWYG editor 1430 and the mobile device email client without a WYSIWYG editor 1440 access one or both of the third party WYSIWYG application service 1475 and the third party complex graphical image and custom font creation engine 1485.

The email clients 1410-1440 shown in this figure connect over the Internet (labeled "cloud") to the set of user authentication and registration server computing devices 1450 to register or login as an existing registered user. Registered user information is stored in the Unlike the tablet device email client with a WYSIWYG editor 1420, the desktop computer email client without a WYSIWYG editor 1430, and the mobile device email client without a WYSIWYG editor 1440, which connect to the set of user authentication and registration server computing devices 1450 directly over the Internet (or "cloud"), the mobile device email client with a WYSIWYG editor 1410 connects to the set of user authentication and registration server computing devices 1450 by way of a wireless connection to the wireless communication point 1422 and through the gateway 1424, finally connecting over the Internet (or "cloud") to the set of user authentication and registration server computing devices 1450. While the example shown in this figure only illustrates the mobile device email client with a WYSIWYG editor 1410 connecting via the wireless communication point 1422 and through the gateway 1424, a person of ordinary skill in the relevant art may understand that any of the email client devices configured to connect wirelessly by cellular or other mobile device signal (e.g., the tablet device email client with a WYSIWYG editor 1420 and the mobile device email client without a WYSIWYG editor 1440) are also able to connect via the wireless communication point 1422 and through the gateway 1424.

Notably, a central aspect of the cloud-based system 1400 is the backend server and backend server modules 1470. In some embodiments, the backend server and backend server modules 1470 provides HTML tree processing to ensure consistent rendering of emails with complex graphics and customized web fonts across virtually all email client applications on any platform or device. In some embodiments, the backend server and backend server modules 1470 does this by way of the backend server 1472, the complex subtree scanning module 1474, the subtree-to-image conversion module 1476, and the subtree replacement editor and image reference manager 1478, any of which may retrieve information from the HTML DOM database 1480. After processing is completed, the backend server 1472 may retrieve information from the secure email delivery configuration database 1490 to provide to the third party email delivery service 1495 for email delivery.

Many of the above-described features and applications are implemented as software programs or modules that carry out one or more processes. Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

These software programs or modules which perform one or more of the processes described herein are each specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc.

The computer readable media does not include carrier waves and electronic signals passing wirelessly or over wired connections.

Also, in this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. In some embodiments, the software programs, when installed to operate on one or more electronic systems, define one or more specific machine implementations that execute and perform the operations of the software programs.

Figure 15:
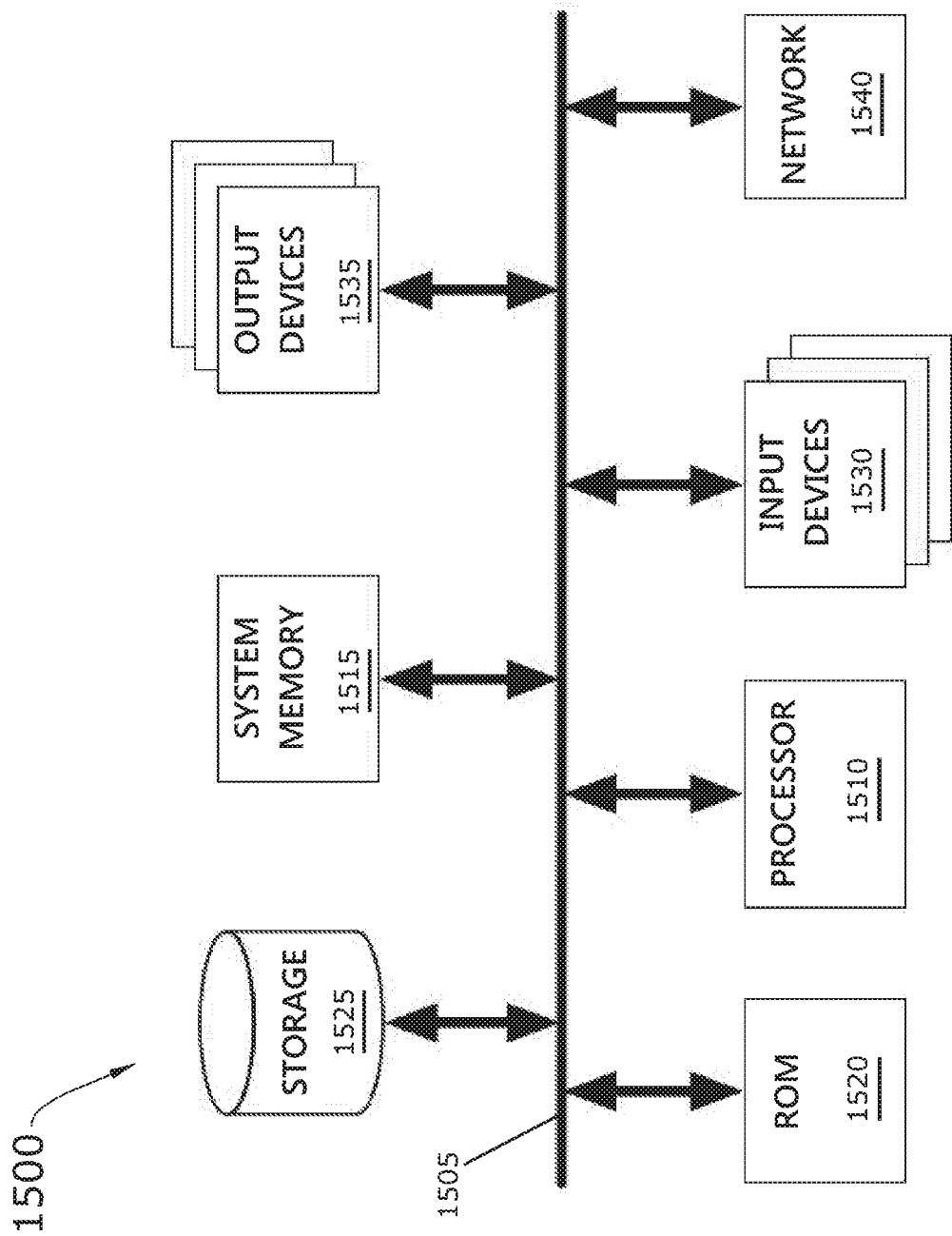
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer, mobile device, tablet, phone, PDA, or any other sort of electronic device. Such an electronic system includes various types of computer readable media and interfaces for various other types of computer readable media. Electronic system 1500 includes a bus 1505, processing unit(s) 1510, a system memory 1515, a read-only 1520, a permanent storage device 1525, input devices 1530, output devices 1535, and a network 1540.

The bus 1505 collectively represents all system, peripheral, and chipset buses that communicatively connect the numerous internal devices of the electronic system 1500. For instance, the bus 1505 communicatively connects the processing unit(s) 1510 with the read-only 1520, the system memory 1515, and the permanent storage device 1525.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1520 stores static data and instructions that are needed by the processing unit(s) 1510 and other modules of the electronic system. The permanent storage device 1525, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1525.

Other embodiments use a removable storage device (such as a floppy disk or a flash drive) as the permanent storage device 1525. Like the permanent storage device 1525, the system memory 1515 is a read-and-write memory device. However, unlike storage device 1525, the system memory 1515 is a volatile read-and-write memory, such as a random access memory. The system memory 1515 stores some of the instructions and data that the processor needs at runtime. In some embodiments, the invention's processes are stored in the system memory 1515, the permanent storage device 1525, and/or the read-only 1520. For example, the various memory units include instructions for processing appearance alterations of displayable characters in accordance with some embodiments. From these various memory units, the processing unit(s) 1510 retrieves instructions to execute and data to process in order to execute the processes of some embodiments.

The bus 1505 also connects to the input and output devices 1530 and 1535. The input devices enable the user to communicate information and select commands to the electronic system. The input devices 1530 include alphanumeric keyboards and pointing devices (also called "cursor control devices"). The output devices 1535 display images generated by the electronic system 1500. The output devices 1535 include printers and display devices, such as cathode ray tubes (CRT) or liquid crystal displays (LCD). Some embodiments include devices such as a touchscreen that functions as both input and output devices.

Finally, as shown in FIG. 15, bus 1505 also couples electronic system 1500 to a network 1540 through a network adapter (not shown). In this manner, the computer can be a part of a network of computers (such as a local area network ("LAN"), a wide area network ("WAN"), or an intranet), or a network of networks (such as the Internet). Any or all components of electronic system 1500 may be used in conjunction with the invention.

Also, the functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through networks.

While the invention has been described with reference to numerous specific details, one of ordinary skill in the art will recognize that the invention can be embodied in other specific forms without departing from the spirit of the invention. Many of the drawings conceptually illustrate runtime or methods, each with multiple steps. For instance, methods and/or processes are demonstrated in FIGS. 2, 3, 11, and 12. In each case, the specific operations of a process or method may not be performed in the exact order shown and described. Specific operations may not be performed in one continuous series of operations, and different specific operations may be performed in different embodiments. Furthermore, each process or method could be implemented using several sub-processes (such as in FIG. 2, which includes a sub-process of steps demonstrated in FIG. 3), or as part of a larger macro process. Thus, one of ordinary skill in the art would understand that the invention is not to be limited by the foregoing illustrative details, but rather is to be defined by the appended claims.

We claim:

1. A system that ensures consistent rendering of emails with complex graphics and customized web fonts across a plurality of email client applications and platforms, said system comprising:

a backend server that receives an HTML tree of an email composed in a what-you-see-is-what-you-get ("WYSIWYG") editor of an email client, said email comprising a plurality of complex graphical elements that correspond to a plurality of complex HTML subtrees of the received HTML tree, wherein each complex graphical element in the plurality of complex graphical elements comprise one or both of complex graphics and customized web fonts;

a complex subtree scanning module that scans the HTML tree for any complex HTML subtrees, wherein the complex subtree scanning module comprises (i) an HTML tree scan manager that scans the HTML tree for subtree code structures, (ii) a complex subtree identification module that evaluates each subtree code structure found by the HTML tree scan manager to determine whether the subtree code structure is a type of complex HTML subtree to flag for replacement, and (iii) a complex subtree flagging module that flags each subtree code structure that is determined to be the type of complex HTML subtree to flag for replacement;

a subtree-to-image conversion module that renders each complex HTML subtree and captures a screenshot of a flat rasterized image rendering of the complex graphical element corresponding to the complex HTML subtree, wherein the subtree-to-image conversion module comprises (i) an HTML rendering engine that renders the HTML tree in an output format that visually outputs images associated with the plurality of complex graphical elements, (ii) a screenshot capture unit that captures a screenshot of each visually output image associated with a complex graphical element in the plurality of complex graphical elements, and (iii) a raster conversion engine that converts each captured screenshot into a new raster image that consistently renders across virtually all email clients on any platform; and a subtree replacement editor and image reference manager that replaces each complex HTML subtree with a replacement HTML subtree that references the flat rasterized image captured by the subtree-to-image conversion module, wherein the subtree replacement editor and image reference manager comprises (i) an HTML subtree code generator that generates HTML subtree code of each new raster image, (ii) a subtree code replacement module that receives the generated HTML subtree code of each new raster image and replaces the flagged HTML subtree in the HTML tree with the generated HTML subtree code, and (iii) a complete HTML tree scan verification unit that checks for completion of the HTML tree scan by the HTML tree scan manager, provides the updated HTML tree to the backend server when the HTML tree scan is completed to output HTML optimized for email, and, when the HTML tree scan is not completed, returns the updated HTML tree to the HTML tree scan manager to continue scanning the HTML tree and flagging complex subtrees for replacement.

2. The system of claim 1, wherein the backend server produces an updated HTML tree based on each replacement HTML subtree inserted in place of the complex HTML subtree, wherein the updated HTML tree comprises HTML optimized for email.

* * * * *

UNITED STATES PATENT AND TRADEMARK OFFICE
CERTIFICATE OF CORRECTION

PATENT NO. : 11,176,313 B1
APPLICATION NO. : 16/893179
DATED : November 16, 2021
INVENTOR(S) : Martha Laura Bitar et al.

It is certified that error appears in the above-identified patent and that said Letters Patent is hereby corrected as shown below:

On the Title Page

Item (71), Applicants should read: Martha Laura Bitar, San Francisco, CA (US); Rebecca Shostak, San Francisco, CA (US); Trong Dong, San Francisco, CA (US); Minh Tran, San Francisco, CA (US)

Item (72), Inventors should read: Martha Laura Bitar, San Francisco, CA (US); Rebecca Shostak, San Francisco, CA (US); Trong Dong, San Francisco, CA (US); Minh Tran, San Francisco, CA (US)

Signed and Sealed this
Twenty-ninth Day of October, 2024

Katherine Kelly Vidal
*Director of the United States Patent and Trademark Office*